(12) United States Patent
Yan et al.

(10) Patent No.: US 11,955,876 B2
(45) Date of Patent: Apr. 9, 2024

(54) FAN AND ELECTRIC APPLIANCE

(71) Applicant: MIDEA WELLING MOTOR TECHNOLOGY (SHANGHAI) CO., LTD., Shanghai (CN)

(72) Inventors: Tiantian Yan, Shanghai (CN); Yiming Hu, Shanghai (CN)

(73) Assignee: MIDEA WELLING MOTOR TECHNOLOGY (SHANGHAI) CO., LTD., Shanghai (CN)

( * ) Notice: Subject to any disclaimer, the term of this patent is extended or adjusted under 35 U.S.C. 154(b) by 323 days.

(21) Appl. No.: 17/519,804

(22) Filed: Nov. 5, 2021

(65) Prior Publication Data

US 2022/0060087 A1    Feb. 24, 2022

Related U.S. Application Data

(63) Continuation of application No. PCT/CN2019/114134, filed on Oct. 29, 2019.

(30) Foreign Application Priority Data

Aug. 9, 2019 (CN) .......................... 201910736310.2
Aug. 9, 2019 (CN) .......................... 201921288514.6

(51) Int. Cl.
*H02K 9/06* (2006.01)
*H02K 1/18* (2006.01)
(Continued)

(52) U.S. Cl.
CPC ................. *H02K 9/06* (2013.01); *H02K 1/18* (2013.01); *H02K 1/20* (2013.01); *H02K 5/20* (2013.01); *H02K 7/08* (2013.01); *H02K 11/33* (2016.01)

(58) Field of Classification Search
CPC . H02K 5/20; H02K 11/33; H02K 7/08; H02K 1/18; H02K 1/20; H02K 9/06;
(Continued)

(56) References Cited

U.S. PATENT DOCUMENTS 11,473,594 B2 * 10/2022 Johnson .............. F04D 25/0606
11,725,671 B2 *  8/2023 Kim ...................... F04D 29/325
                                                              417/423.14
(Continued)

FOREIGN PATENT DOCUMENTS

CN          105024491 A     11/2015
CN          205154683 U      4/2016
(Continued)

OTHER PUBLICATIONS

EP-2677174-A2 machine translation Nov. 18, 2023.*
(Continued)

*Primary Examiner* — Leda T Pham
(74) *Attorney, Agent, or Firm* — Scully, Scott, Murphy & Presser, P.C.

(57) ABSTRACT

An electrical fan and an electric appliance are provided. The fans has a driving structure, an impeller, a wind hood and a diffuser. The impeller has a cover plate installed on the driving structure. The wind hood is covered on the impeller and has an air inlet and an air outlet communicated to each other. The diffuser is located at one end of the impeller facing the air outlet. The diffuser has a first protrusion connected to the driving structure. The first protrusion protrudes in a direction of the wind hood. The diameter of an end of the first protrusion adjacent the cover plate is smaller than the diameter of an end away from the cover plate. The diffuser has an inner ring arm connected to the first protrusion and an outer ring arm sleeved outside the inner ring arm.

29 Claims, 8 Drawing Sheets

(51) Int. Cl.
*H02K 1/20* (2006.01)
*H02K 5/20* (2006.01)
*H02K 7/08* (2006.01)
*H02K 11/33* (2016.01)

(58) Field of Classification Search
CPC .... F04D 29/059; F04D 17/165; F04D 29/444; F04D 29/4253; F04D 29/281; F04D 29/542; F04D 17/06
See application file for complete search history.

(56) References Cited

U.S. PATENT DOCUMENTS

| | | |
|---|---|---|
| 2018/0266438 A1 | 9/2018 | Hayamitsu |
| 2018/0335039 A1 | 11/2018 | Hayamitsu |

FOREIGN PATENT DOCUMENTS

| | | | |
|---|---|---|---|
| CN | 206221315 U | 6/2017 | |
| CN | 206889291 U | 1/2018 | |
| EP | 2677174 A2 * | 12/2013 | ............. F04D 17/06 |
| EP | 2677174 A2 | 12/2013 | |
| JP | 3724265 B2 | 12/2005 | |

OTHER PUBLICATIONS

International Search Report dated May 14, 2020 received in International Application No. PCT/CN2019/114134 together with an English language translation.

Extended European Search Report dated Aug. 12, 2022 received in European Patent Application No. EP 19941570.4.

* cited by examiner

FAN AND ELECTRIC APPLIANCE

CROSS-REFERENCE TO RELATED APPLICATIONS

The present application is a continuation application of PCT International Application No. PCT/CN2019/114134, filed on Oct. 29, 2019, which claims priority to and benefits of Chinese Patent Application No. 201910736310.2 filed with China National Intellectual Property Administration on Aug. 9, 2019 and entitled "FAN AND ELECTRIC APPLIANCE" and Chinese Patent Application No. 201921288514.6 filed with China National Intellectual Property Administration on Aug. 9, 2019 and entitled "FAN AND ELECTRIC APPLIANCE", the entire contents of which are incorporated herein by reference for all purposes. No new matter has been introduced.

FIELD

The present disclosure relates to the technical field of household appliances, in particular, to a fan and electric appliance.

BACKGROUND

At present, high-speed fans generally use a motor to drive the impeller to rotate at a high speed, to form a negative pressure environment in the sealed housing, so that dust and other debris can be sucked into the dust collection device, so as to achieve a good air supply effect. The high-speed, high-efficiency, and high-power development trend of fans is obvious, but high-power and high-speed will aggravate fluid and mechanical losses. As a result, the temperature rise is overly high, which brings great challenges to the high-efficiency wind tunnel design, bearing design and heat dissipation design of the whole machine. The small high-speed fan in the prior art has an efficiency of 52.5% under 400 W~120000 rpm working conditions, and under 500 W~125000 rpm working conditions, the efficiency does not exceed 50%, and complex flow path design is required to solve the heat dissipation problem of heating devices. When consumer demand changes, such as greater suction power (increased power) or low-power lightweight products, the power range and speed range that the existing technology can efficiently cover is very narrow, and the efficiency of the whole machine is highly sensitive to design input.

SUMMARY

The present disclosure is directed to solve at least one of the technical problems existing in the prior art or the related art.

To this end, the first aspect of the present disclosure provides a fan.

The second aspect of the present disclosure provides an electric appliance.

In view of this, the first aspect of the present disclosure provides a fan, comprising: a driving structure; an impeller, including a cover plate, the cover plate being installed on the driving structure, the cover plate being recessed in an axial direction of the impeller, and a diameter of the cover plate gradually increasing along an air inlet direction; a wind hood, being covered on the impeller, and an air inlet and an air outlet communicated to the air inlet being provided on the wind hood; and a diffuser, being located at one end of the impeller facing the air outlet, and the diffuser including a first protrusion connected to the driving structure, the first protrusion protruding in a direction of the wind hood, and a diameter of one end of the first protrusion adjacent to the cover plate being smaller than a diameter of one end away from the cover plate, the diffuser also including an inner ring arm connected to the first protrusion and an outer ring arm sleeved outside the inner ring arm, and the outer ring arm being smoothly and transitionally connected to the wind hood, and the first protrusion, the inner ring arm, and the outer ring arm being coaxially arranged, wherein, the wind hood, the cover plate, and the diffuser defines a wind tunnel, the wind tunnel includes a variable section portion and an equal section portion, the variable section portion is arranged adjacent to the air inlet, and the equal section portion is arranged adjacent to the air outlet.

The present disclosure provides a fan, including a driving structure, a wind hood, an impeller and a diffuser. The driving structure drives the impeller to rotate so that the airflow flows from the air inlet to the air outlet, the diffuser includes a first protrusion, an inner ring arm and an outer ring arm which are coaxially arranged, and the first protrusion is arranged adjacent to the impeller. The inner ring arm is connected with the first protrusion and is located below the first protrusion. The outer ring arm and the inner ring arm are sleeved together. The first protrusion protrudes toward the wind hood, and the diameter of the first protrusion gradually increases. The wind hood, the cover plate and the diffuser define the wind tunnel, and the airflow flows from the air inlet to the air outlet through the wind tunnel, and the space formed between the impeller and the wind hood changes the direction and kinetic energy of the fluid. When the airflow passes through the wind tunnel formed between the first protrusion and the wind hood, the dynamic pressure is converted into static pressure. At the same time, the airflow is directed radially outward and downward, and finally the airflow is led out of the wind tunnel through the annular air cavity composed of the inner ring arm and the outer ring arm. The airflow in the entire wind tunnel is very smooth, reducing impact loss and separation loss. The wall of the wind hood and the wall of the diffuser are smoothly and transitionally connected. In other words, the diameter of the connecting part between the wall of the wind hood and the wall of the diffuser is the same. Further, the inner wall surface of the wind hood and the inner wall surface of the diffuser are smoothly and transitionally connected, so that the airflow does not produce impact when passing through the joint between the wind hood and the diffuser, thereby reducing the impact loss at the connection and improving the efficiency of fan.

Further, the wind tunnel includes a variable section portion and an equal section portion, the variable section portion is adjacent to the air inlet, and the equal section portion is adjacent to the air outlet. And along the air inlet direction, the cross-sectional area of the variable section portion gradually decreases, and the cross-sectional area of the equal section portion remains unchanged. The variable section portion and the equal section portion are smoothly and transitionally connected to make the airflow in the wind tunnel very smooth, reducing impact loss and separation loss.

Further, the space between the impeller and the wind hood constitutes a variable section portion, and the space between the diffuser and the wind hood constitutes an equal section portion.

Further, the air flow enters the wind tunnel from the air inlet roughly along the axial direction of the driving structure, and the distance between the center line of the wind tunnel and the axis of the driving structure gradually increases, so that the airflow is gradually guided to the radial outside and below the driving structure when passing through the wind tunnel.

Further, the wind hood, the impeller and the diffuser are coaxially arranged, and the wall surface of the first protrusion toward the wind hood is a smooth convex surface with a gradually increasing diameter.

According to the above-mentioned fan provided by the present disclosure, it may also have the following additional technical features.

In any of the above-mentioned embodiments, the driving structure comprises: a stator assembly, being arranged relative to the air outlet, so that the wind flow from the air outlet blowing directly to the stator assembly.

In this embodiment, the driving structure includes a stator assembly, the stator assembly is arranged at the air outlet, and the wind flow from the air outlet is directly blown to the stator assembly, which improves the heat dissipation effect of the stator assembly.

In any of the above-mentioned embodiments, an angle between an extension direction of one end of the cover plate facing the first protrusion and an extension direction of one end of the first protrusion facing the cover plate is less than or equal to a first threshold.

In this embodiment, the angle between the extension direction of one end of the cover plate facing the first protrusion and the extension direction of one end of the first protrusion facing the cover plate is less than or equal to the first threshold. In other words, in the two ends of the cover plate and the first protrusion that are adjacent to each other, the angle between the tangent of the end circumference of the first protrusion and the tangent of the end circumference of the cover plate is less than or equal to the first threshold. Therefore, the angle between the flow direction when the airflow through the cover plate toward the end of the first protrusion and the flow direction when the airflow through the first protrusion toward the end of the cover plate is less than or equal to the first threshold. The value of the first threshold can be between −2° and 2°, and the first threshold can also be other smaller angles. In other words, the end of the first protrusion is roughly arranged in the tangential direction of the end of the cover plate, which makes the transition between the first protrusion and the end of the cover plate smoother. When the airflow passes through the junction between the first protrusion and the cover plate, the impact loss is greatly reduced, thereby improving the efficiency of the fan.

Further, the diameter of the end of the first protrusion facing the air inlet is greater than or equal to the diameter of the end of the impeller facing the air outlet. In other words, in the two ends of the first protrusion and the impeller adjacent to each other, the end of the first protrusion is larger than the end of the impeller, so that the airflow is gradually directed to the radial outside and below of the driving structure when the airflow from the impeller to the first protrusion.

In any of the above-mentioned embodiments, one end of the first protrusion facing the air inlet is provided with a ring-shaped depression, and one end of the cover plate facing the diffuser is provided with a ring-shaped protrusion portion, and the depression is in clearance fit with the protrusion portion.

In this embodiment, a depression is arranged on the first protrusion, and a protrusion portion is arranged on the cover plate. The depression is adapted to the protrusion portion. Since the cover plate rotates at a high speed and the diffuser is fixed, the two must be in clearance fit. Further, the gap between the depression and the protrusion portion is less than the predetermined threshold. In other words, there is a small gap fit between the depression and the protrusion portion. When the fluid flows from the cover plate to the first convex surface, it will inevitably enter the gap between the two and cause leakage loss. A small clearance fit can reduce this leakage and improve efficiency. At the same time, the protrusion portion is located below the cover plate, which can be used as the balance ring of the cover plate to balance and remove the weight. It is no longer necessary to arrange the balance ring of the cover plate separately, reducing the number of parts, simplifying the assembly process, and reducing the cost.

In any of the above-mentioned embodiments, a diameter of a joint between the first protrusion and the inner ring arm is the same as a diameter of an outer wall surface of the inner ring arm and is smoothly and transitionally connected.

In this embodiment, the diameter of the joint between the first protrusion and the inner ring arm is the same as the diameter between the outer wall surfaces of the inner ring arm. Further, the joint between the first protrusion and the inner ring arm is smoothly and transitionally connected, thereby reducing the impact loss when the airflow through the joint between the first protrusion and the inner ring arm, thereby improving the working efficiency of the fan.

In any of the above-mentioned embodiments, one side of the outer ring arm away from an axis of the driving structure is provided with a first notch, and one side of the wind hood facing an axis of the driving structure is provided with a second notch adapted to the first notch, the first notch and the second notch are both ring-shaped, and one side of the outer ring arm facing the air inlet abuts against a bottom of the second notch.

In this embodiment, the outer ring arm is provided with a first notch, and the inner side corresponding to the wind hood is provided with a second notch. The first notch matches the second notch. Further, the depth of the second notch along the radial direction of the first protrusion is equal to the remaining thickness of the outer ring arm after the first notch is arranged, so that the connected wind hood and the outer ring arm are smoothly and transitionally connected. At the same time, through the cooperation of the first notch and the second notch, the radial positioning of the wind hood and the diffuser is realized, and the coaxiality of the diffuser and the wind hood is ensured.

Further, the first notch and the second notch are all ring-shaped, and one side of the outer ring arm facing the air inlet abuts on the bottom of the second notch.

In this embodiment, the first notch and the second notch are all ring-shaped, which improves the reliability of the joint between the diffuser and the wind hood. One side of the outer ring arm facing the air inlet abuts on the bottom of the second notch. In other words, the top of the outer ring arm abuts on the groove bottom of the second notch, which realizes the axial positioning of the diffuser and the wind hood. At the same time, it also ensures the smooth and transitional joint between the inner wall surface of the wind hood and the inner wall surface of the outer ring arm, ensuring the smoothness of the medium flow.

In any of the above-mentioned embodiments, the diffuser further comprises: a first blade, being arranged between the inner ring arm and the outer ring arm, and both ends of the first blade along a radial direction of the diffuser are respectively being attached to the inner ring arm and the outer ring arm, so that the first blade, the inner ring arm and the outer ring arm constitute an air guiding cavity, wherein, the first blade is in a spiral shape, the first blade includes an inlet end and an outlet end along the air inlet direction, and the inlet end is located behind the outlet end along a rotation direction of the impeller.

In this embodiment, the diffuser further comprises a first blade; the first blade is arranged between the inner ring arm and the outer ring arm, wherein the two ends of the first blade along the radial direction of the diffuser are attached to the inner ring arm and the outer ring arm respectively. In other words, the first blade extends in the diffuser axial direction to the inner ring arm, and extends away from the diffuser axial direction to the outer ring arm, so that the root of the first blade is attached to the inner ring arm and the top is attached to the outer ring arm. Thus, an air guiding cavity is formed between the inner ring arm, the first blade, the outer ring arm, and the air guiding cavity formed by the ring space between the inner ring arm, the outer ring arm and the first blade is relatively closed. After the airflow enters the air guiding cavity, it only flows out from the outlet of the air guiding cavity, which avoids the efficiency loss caused by the seal leakage of the first blade during the expansion process, and also simplifies the assembly process. The first blade is in a spiral shape. The inlet end is located after the outlet end along the rotation direction of the impeller, which is beneficial to reduce the loss of airflow along the way and the impact loss of the outlet end.

In any of the above-mentioned embodiments, the first blade is completely located in an air cavity between the inner ring arm and the outer ring arm.

In this embodiment, the first blade is completely located in the air guiding cavity in the axial direction, In other words, the first blade is completely located in the annular air cavity composed of the inner ring arm and the outer ring arm, which can ensure the uniformity of the airflow of the first blade inlet end and the outlet end, and avoid the influence of other structures on airflow.

In any of the above-mentioned embodiments, an angle between an extension direction of the inlet end and a radial direction of the inner ring arm is less than or equal to a second threshold, the outlet end includes a first inner end point connected to the inner ring arm and a first outer end point connected to the outer ring arm, along a rotation direction of the impeller, the first inner end point is located at the front of the first outer end point.

In this embodiment, the extension direction of the inlet end is the extension direction of the inlet end from the inner ring arm to the outer ring arm. The angle between the extension direction of the inlet end and the radial direction of the inner ring arm is less than or equal to the second threshold. The value range of the second threshold depends on the specific situation, such as −2° to 2° or other suitable values. In other words, the inlet end is roughly arranged in the direction of the radial extension of the inner ring arm. The first inner end point of the outlet end is located in front of the first outer end point. In other words, the first inner end point is in front of the first outer end point.

In any of the above-mentioned embodiments, along an axial direction of the diffuser, the inlet end is a smooth curved surface convex in a direction of the impeller, and the outlet end is a smooth curved surface convex in a direction away from the impeller, along a rotation direction of the impeller, in two sides of the first blade, a front side is convex toward the rotation direction of the impeller, and a rear side is recessed toward the rotation direction of the impeller.

In this embodiment, along the axial direction of the diffuser, the inlet end is a smooth surface convex toward the impeller direction, and the outlet end is a smooth surface convex toward the direction away from the impeller, which ensures the uniformity of the airflow of the inlet end and reduces the impact loss of the outlet end. Along the rotation direction of the impeller, the two sides of the first blade are located on the front side. In other words, the pressure surface of the first blade is recessed toward the rotation direction of the impeller and is located on the rear side. In other words, the back pressure surface of the first blade is recessed toward the rotation direction of the impeller, which helps to reduce the loss of airflow along the way, which in turn helps to improve the efficiency of the fan.

In any of the above-mentioned embodiments, the inner ring arm, the first blade and the outer ring arm are integrated structure.

In this embodiment, the inner ring arm and the outer ring arm are circular rings, wherein the outer ring arm is arranged on the radial outside of the inner ring arm. The spiral first blade is arranged between the inner ring arm and the outer ring arm, and is connected with the inner ring arm and the outer ring arm to form an integral part. Since the two ends of the first blade along the radial direction of the inner ring arm are respectively attached to the inner ring arm and outer ring arm, the first blade and the inner ring arm, and the outer ring arm can be easily molded as an integral part, therefore, it is not necessary to make the first blade and one of the inner ring arm and the outer ring arm be integrally formed and then be assembled and connected with another one. The setting of the integrated diffuser can form a sealed air guiding cavity between the oppositely arranged cylindrical surface of the inner ring arm and the outer ring arm, and the pressure surface and the back pressure surface of the two adjacent first blades. The efficiency loss caused by the leakage of the first blade during the expansion process is avoided, and the assembly process is also simplified.

In any of the above-mentioned embodiments, the number of the first blade is multiple, and the multiple first blades are evenly distributed between the inner ring arm and the outer ring arm along a circumference of the inner ring arm.

In this embodiment, the number of the first blade is multiple, and the multiple first blades are evenly distributed between the inner ring arm and the outer ring arm along a circumference of the inner ring arm. Further, the number of the first blades is 12.

In any of the above-mentioned embodiments, the impeller further comprises: a second blade, being arranged on the cover plate, and located in the wind tunnel, wherein along the air inlet direction, the second blade includes a front edge adjacent to the air inlet and a rear edge adjacent to the air outlet, and along the rotation direction of the impeller, the front edge is located in front of the rear edge.

In this embodiment, the impeller further comprises a second blade, the outer wall surface of the cover plate is a smooth concave surface, wherein the airflow enters the wind tunnel from the air inlet to obtain a more uniform flow field, and then enters the independent flow channel space composed of two adjacent second blades through the front edge. This avoids the influence of the flow field change at the inlet end on the fluid movement between the second blades. The front edge is located in front of the rear edge, so that the extension direction of the flow channel space between two adjacent second blades is the same as the rotation direction of the impeller.

Further, the second blade intersects with the outer wall surface of the cover plate to form the root of the blade, and the second blade extends in the direction away from the outer wall surface of the cover plate and forms the top of the blade at the largest outer diameter.

In any of the above-mentioned embodiments, along the air inlet direction, the diameter of the cover plate gradually increases.

In this embodiment, along the air inlet direction, the diameter of the cover plate gradually increases. Further, the outer wall surface of the cover plate is a smooth concave surface with a gradually increasing diameter.

In any of the above-mentioned embodiments, an angle between an extension direction of the front edge and an axial direction of the driving structure is within a range of 76°±2°, the rear edge is located on a cylindrical surface formed by an outer side wall of the protrusion portion.

In this embodiment, the angle between the imaginary straight line where the front edge is located and the axis of the cover plate is within the range of 76°±2°, so that the front edge is arranged roughly along the radial direction of the cover plate. For example, the angle between the imaginary straight line where the front edge is located and the axis of the cover plate is greater than or equal to 74° and less than or equal to 78°; the rear edge is located on the cylindrical surface formed by the outer wall surface of the protrusion portion, thereby reducing the impact loss when the airflow through the rear edge.

In any of the above-mentioned embodiments, the front edge includes a second inner end point connected to the cover plate and a second outer end point away from the cover plate, along a rotation direction of the impeller, the second outer end point is located at the front of the second inner end point, in a direction from the air outlet to the air inlet, and the second inner end point is located below the second outer end point, and the second outer end point is located at an end of the cover plate facing the air inlet and below the air inlet, the rear edge includes a third inner end point connected to the cover plate and a third outer end point away from the cover plate, the third inner end point is located on a circumferential line of the impeller facing one end of the diffuser, in a direction from the air outlet to the air inlet, the third outer end point is located above the third inner end point.

In this embodiment, since the front edge starts from the root of the front edge and extends to the radial outside and above the cover plate, when the airflow flows into the flow channel formed by the second blade, it flows in an oblique direction, which effectively controls the air volume and pressure of the front edge, and reduces the fluid loss of the front edge. At the same time, the second outer end point is arranged above the second inner end point to ensure that the streamline length at the top of the second blade is slightly larger than the streamline length at the root of the second blade, so that the airflow has a more uniform flow state at the rear edge. For example, the second inner end point and the second outer end point are the two end points at the junction of the pressure surface and the back pressure surface of the second blade and the cover plate. The second outer end point is located at the end of the cover plate facing the air inlet and below the air inlet, avoiding air leakage losses into the wind tunnel. The joint between the rear edge and the cover plate is located on the circumference of the impeller facing one end of the diffuser, so that the airflow smoothly flows out of the flow channel formed by the second blade. The third outer end point is located above the third inner end point, and the inclination angle of the rear edge is arranged reasonably to help reduce the fluid loss at the outlet end.

For example, the extension direction of the front edge is the connection direction between the second inner end point and the second outer end point, and the extension direction of the rear edge is the extension direction from the root of the rear edge to the top of the rear edge.

In any of the above-mentioned embodiments, in a projection of the impeller on a plane perpendicular to an axis of the driving structure, an angle between a line between the second inner end point and an axis of the driving structure and a line between the second outer end point and an axis of the driving structure is greater than or equal to 0° and less than or equal to 5°.

In this embodiment, the angle between the line connecting the second inner end point and the shaft center and the line connecting the second outer end point and the shaft center is greater than or equal to 0° and less than or equal to 5°. The small front angle at the top of the front edge is conducive to fitting fluid drainage, while ensuring that the impeller is manufacturable.

In any of the above-mentioned embodiments, in a projection of the impeller on a plane perpendicular to an axis of the driving structure, an angle between a line between the third inner end point and an axis of the driving structure and a line between the third outer end point and an axis of the driving structure is greater than or equal to −2° and less than or equal to 2°.

In this embodiment, by setting the inclination angle of the rear edge reasonably, it is beneficial to reduce the fluid loss at the outlet of the impeller, reduce the gap leakage at the outlet of the impeller, reduce the existence of secondary flow and jet wake at the outlet of the impeller, and improve the efficiency of the impeller. The angle between the line connecting the third inner end point and the axis of the driving structure and the line connecting the third outer end point and the axis of the driving structure is greater than or equal to −2° and less than or equal to 2°. In other words, the top of the rear edge is roughly set in the axial direction of the root of the rear edge.

In any of the above-mentioned embodiments, the front edge protrudes toward a direction of the air inlet, and a length of the rear edge is less than a length of the front edge.

In this embodiment, the front edge is convex toward the air inlet and is a smooth curved surface, smoothly connecting the pressure surface and the suction surface. The second blade extends toward the air inlet and becomes thinner, which can increase the length of the second blade while reducing the relative diffusion speed. The length of the rear edge is less than the length of the front edge, which can effectively control the ratio of the inlet and outlet areas of the flow channel between adjacent second blades, reduce the diffusion loss of the flow, broaden the range of the high-efficiency zone under small flow conditions, and reduce aerodynamic noise.

Further, the thickness of the front edge is smaller than that of the rear edge.

In any of the above-mentioned embodiments, the ratio of the length of the rear edge to the length of the front edge is greater than or equal to 0.4 and less than or equal to 0.46.

In this embodiment, by setting the length of the rear edge reasonably, it is beneficial to reduce the fluid loss at the outlet end, reduce the gap leakage of the impeller outlet, reduce the existence of secondary flow and jet wake at the impeller outlet, and improve the efficiency of the impeller. The ratio of the length of the rear edge to the length of the front edge is greater than or equal to 0.4 and less than or equal to 0.46.

In any of the above-mentioned embodiments, there is a first gap between one end of the second blade away from an axis of the impeller and the inner wall surface of the wind hood, wherein, the first gap is arranged equidistantly in a direction from the air inlet to the air outlet, or the first gap is gradually reduced in a direction from the air inlet to the air outlet.

In this embodiment, since the impeller and the wind hood rotate at a relatively high speed, there is a need for clearance fit between the two to ensure that the gap is gradually reduced from top to bottom or set at an equal distance from top to bottom, which can effectively improve the efficiency of the fan.

In any of the above-mentioned embodiments, the first gap is greater than or equal to 0.2 mm and less than or equal to 0.3 mm.

In this embodiment, if the first gap is too large, it will seriously affect the efficiency of the wind tunnel. If the first gap is too small, it will greatly increase the difficulty of assembly. The most suitable first gap is between 0.2 mm~0.3 mm. At the same time, since the length of the front edge is greater than the length of the rear edge, the first gap at the rear edge will have a greater impact on efficiency than at the front edge. Therefore, it is ensured that the first gap is gradually reduced from top to bottom, which can effectively improve the efficiency of the fan.

In any of the above-mentioned embodiments, the number of the second blade is multiple, and the multiple second blades are evenly arranged on the cover plate along a circumferential direction of the cover plate.

In this embodiment, the number of the second blade is multiple, and the multiple second blades are evenly arranged on the cover plate along a circumferential direction of the cover plate.

For example, the projection of the root of the second blade on the plane perpendicular to the axial direction satisfies: the wrap angle $\theta_1$ is within the range of $120°\pm 3°$. The projection of the top of the second blade on the plane perpendicular to the axial direction satisfies: the wrap angle $\theta_2$ is within the range of $123°\pm 3°$. The wrap angle $\theta_1$ is the angle between a line connecting the two end points of the projection of the root of the second blade on the plane perpendicular to the axial direction and the axis. The wrap angle $\theta_2$ is the angle between a line connecting the two end points of the projection of the top of the second blade on a plane perpendicular to the axial direction and the axis.

$$\theta_2 \geq \theta_1$$

For example, the larger the wrap angle of the second blade, the smaller the outflow and vortex in the flow channel, and the flow is closer to the profile of the second blade. Similarly, under the diameter of the impeller, the impeller speed will be higher; however, the wrap angle of the second blade that is too large will cause the friction loss to increase, the high-efficiency point will move in the direction of small flow, and it will also cause difficulty in demolding. The wrap angle range given in the present disclosure can make the impeller work efficiently within the speed range of 100,000 rpm to 150,000 rpm.

The projection of the root of the second blade on the plane perpendicular to the axial direction satisfies: the inlet placement angle $\beta_1$ is within the range of $23.5°\pm 3°$; the outlet placement angle $\beta_2$ is within the range of $33.5°\pm 3°$. The projection of the top of the second blade on the plane perpendicular to the axial direction satisfies: the inlet placement angle $\beta_3$ is within the range of $0°\sim 3°$; the outlet placement angle $\beta_4$ is within the range of $28.5°\pm 3°$.

For example, the selection of the inlet placement angle will affect the flow state when the fluid enters the impeller channel. A proper inlet placement angle can reduce the squeezing effect of the root inlet of the second blade and increase the flow area. At the same time, it can avoid serious flow loss at the inlet end of the suction surface, and can reduce the flow loss. The selection of the outlet placement angle will affect the vacuum of the fan. It is an effective measure to improve the efficiency of the centrifugal fan to reduce the outlet placement angle while reducing the outer diameter of the impeller. Because the impeller working speed of this embodiment can reach 150,000 rpm, an excessively large impeller diameter will cause insufficient structural strength and the impact of unbalanced mass on the rotor assembly, but if the outlet placement angle is too small, it will affect the manufacturability of the product. Choosing the above-mentioned inlet and outlet placement angles can make the impeller enter and exit fluid in the speed range of 100000 rpm~150,000 rpm to maintain uniformity, reduce fluid loss, improve the vacuum and efficiency of the fan, and reduce the outer diameter of the impeller to ensure strength and manufacturability.

The maximum diameter of impeller does not exceed 32 mm.

The outer wall surface of the cover plate is formed as a smooth concave surface, the upper inflow angle $\delta_1$ of the outer wall surface of the cover plate is in the range of $4°\pm 2°$, and the lower end outflow angle $\delta_2$ is in the range of $57.5°\pm 2°$.

The thickness of the second blade gradually increases from the front edge to the rear edge, and the ratio of the thickness of the front edge to the thickness of the rear edge is not less than 80%.

The impeller has 7 second blades equally spaced along the circumferential direction.

In any of the above-mentioned embodiments, an inner wall surface of the wind hood includes a first inner wall surface corresponding to the cover plate and a second inner wall surface corresponding to the first protrusion, the first inner wall surface protrudes from an outside of the wind hood to an axial direction of the wind hood, the second inner wall surface is recessed from an axis of the wind hood toward an outside direction of the wind hood, wherein, the first inner wall surface, the second inner wall surface, an outer wall surface of the cover plate, an outer wall surface of the first protrusion, an outer wall surface of the inner ring arm, and an inner wall surface of the outer ring arm constitute the wind tunnel.

In this embodiment, the inner wall surface of the wind hood includes a first inner wall surface and a second inner wall surface, the first inner wall surface is arranged corresponding to the cover plate, and the second inner wall surface is arranged corresponding to the first protrusion. And the first inner wall surface is a smooth convex surface, and the second inner wall surface is a smooth concave surface. It forms a variable section portion and an equal section portion with the cover plate, the first protrusion, the inner ring arm and the outer ring arm. For example, the first inner wall surface, the second inner wall surface, the outer wall surface of the cover plate, the outer wall surface of the first protrusion, the outer wall surface of the inner ring arm, and the inner wall surface of the outer ring arm constitute a wind tunnel.

In any of the above-mentioned embodiments, along the air inlet direction, a diameter of the first inner wall surface and a diameter of the second inner wall surface gradually increase.

In this embodiment, along the air inlet direction, a diameter of the inner wall surface of the wind hood gradually increases.

In any of the above-mentioned embodiments, a diameter of a joint between the second inner wall surface and the outer ring arm is the same as a diameter of an inner wall surface of the outer ring arm, along an axial direction of the driving structure, a height difference between a joint between the second inner wall surface and the outer ring arm, and a joint between the first protrusion and the inner ring arm is less than or equal to a third threshold.

In this embodiment, the diameter of the joint between the second inner wall surface and the outer ring arm is the same as the diameter of the inner wall surface of the outer ring arm. Thus, the inner wall surface of the wind hood and the outer ring arm are smoothly and transitionally connected to reduce the impact loss of the airflow and improve the efficiency of the fan. Along the axial direction of the driving structure, the height difference between the joint between the second inner wall surface and the outer ring arm, and the joint between the first protrusion and the inner ring arm is less than or equal to the third threshold, and the third threshold is optionally 0 mm to 5 mm. In other words, the joint between the second inner wall surface and the outer ring arm is roughly at the same height as the joint between the first protrusion and the inner ring arm.

In any of the above-mentioned embodiments, the wind hood further comprises: a collecting surface, along an air inlet direction, a diameter of the collecting surface being gradually decreased, the air inlet being located at one end of the collecting surface, another end of the collecting surface and the first inner wall surface smoothly and transitionally connected, wherein, one end of the impeller facing the air inlet is located in the wind hood.

In this embodiment, along an air inlet direction, a diameter of the collecting surface being gradually decreased, the air inlet being located at one end of the collecting surface, another end of the collecting surface and the first inner wall surface smoothly and transitionally connected. Thus, the airflow establishes a uniform velocity field and fluid field before entering the flow channel of the impeller, which can effectively improve the efficiency of the fan. Further, one end of the impeller toward the air inlet is located in the wind hood. For example, the collecting surface, the first inner wall surface and the second inner wall surface together constitute the inner wall surface of the wind hood, and the wind hood is a thin-walled structure.

In any of the above-mentioned embodiments, the driving structure further comprises: a bearing assembly, including a rotation shaft, a bushing being nested on the rotation shaft, and multiple sets of rolling bodies arranged between the bushing and the rotation shaft, and the impeller being fixed on one end of the rotation shaft; and a rotor, being fixed on another end of the rotation shaft.

In this embodiment, the driving structure further comprises a bearing assembly and a rotor, the bearing assembly includes a bushing and multiple sets of rolling body, the rolling body is located between the bushing and the rotation shaft. The rotation shaft passes through the bushing and the rolling body, one end is connected to the impeller, another end is connected to the rotor, and the rotor is fixed at the lower end of the rotation shaft. Further, the rolling body is evenly arranged between the bushing and the rotation shaft along the circumference of the rotation shaft.

In any of the above-mentioned embodiments, an outer diameter of the bushing is greater than or equal to 12 mm and less than or equal to 14 mm, an outer diameter of an area on the rotation shaft that cooperates with the bushing is greater than or equal to 4 mm and less than or equal to 6 mm.

In this embodiment, the outer diameter of the bushing is greater than or equal to 12 mm and less than or equal to 14 mm, correspondingly, the outer diameter of an area on the rotation shaft that cooperates with the bushing is greater than or equal to 12 mm and less than or equal to 14 mm. the bushing has an outer cylindrical surface with a diameter of 13 mm, and the part of the rotation shaft corresponding to the axis of the bushing has an outer cylindrical surface with a diameter of 5 mm.

In any of the above-mentioned embodiments, the cover plate and the first protrusion are thin-walled structures, the first protrusion defines a first installation cavity, and the cover plate defines a second installation cavity, an installation portion is provided in the second installation cavity, the installation portion is sleeved outside the rotation shaft, and the impeller is fixed on the rotation shaft through the installation portion, wherein, the rolling body adjacent to the impeller is at least partially located in the second installation cavity.

In this embodiment, the cover plate and the first protrusion are thin-walled structures, so the inside of the first protrusion defines the first installation cavity, and the inside of the cover plate defines the second installation cavity. The thin-walled structure can ensure the shrinkage consistency of the impeller during molding, while reducing the moment of inertia of the impeller, improving efficiency, and at the same time, under the premise that the axial size permitting, making the support position as adjacent to the center of gravity of the impeller as possible, which can reduce the impact of impeller imbalance on the bearing, thereby improving the reliability of the assembly. Further, the second installation cavity is also provided with an installation portion, and the impeller is fixed on the rotation shaft through the installation portion. At the same time, the rolling body adjacent to the impeller is at least partly located in the second installation cavity.

In any of the above-mentioned embodiments, a through hole is arranged on the installation portion, and the through hole is arranged along the axial direction of the installation portion.

In this embodiment, the installation portion is further provided with a through hole, the diameter of the through hole is smaller than the diameter of the installation portion and the installation hole of the driving structure, and penetrates the installation portion along the axial direction. The setting of the through hole, on the one hand, plays a role of venting when installing the driving structure, preventing the closed hole from causing assembly errors; at the same time, it can reduce the material and the moment of inertia. For example, the rotation shaft is fixedly connected to the installation hole, and the combined length of the rotation shaft and the installation hole is greater than or equal to 6 mm and less than or equal to 10 mm. Under the premise of ensuring the reliability of positioning, make full use of the axial space.

In any of the above-mentioned embodiments, the number of the rolling bodies is two.

In this embodiment, the number of the rolling body is two, and the two rolling bodies are located at both ends of bushing.

Further, the axial span L between the two sets of the rolling bodies is between 16 mm~18 mm.

Further, the axial span L between the two sets of the rolling bodies is between 10 mm~12 mm.

Further, the outer circumference of the rotation shaft is provided with two grooves at an axial interval, the span of the two grooves is consistent with the span L of the rolling body, and the two sets of rolling bodies are respectively arranged in the grooves. The raceway of the rolling body is directly opened on the rotation shaft, which can save the radial size occupied by the inner ring of the bearing assembly. Under the premise that the shaft diameter is not reduced, the center distance of the rolling body is further reduced, which can effectively increase the limit speed of the bearing.

The center distance of the rolling body is 6.4 mm.

The inner circumference of the bushing is provided with two grooves at an axial interval, the span of the groove is consistent with the span L of the rolling body, and the two sets of rolling bodies are respectively arranged in the grooves. The raceway of the rolling body is directly opened on the bushing, which can save the radial size occupied by the outer ring of the bearing assembly. Thus, the bushing has a greater thickness and improves overall rigidity; or further reduces the outer diameter of bushing and reduces the weight of components.

A first outer ring and a second outer ring are fixedly arranged inside both ends of the bushing, respectively. The inner peripheral surfaces of the first outer ring and the second outer ring are respectively provided with grooves, and the two sets of rolling bodies are respectively arranged in the grooves. The outer ring and the bushing of this structure are assembled parts, and the axial distance of the two outer rings can be adjusted to control the clearance, apply pre-tightening force, and reduce the processing accuracy requirements of the bushing.

The rotation shaft is a through shaft with a diameter of 5 mm. There are several grooves on the through shaft to install the rolling body and contain the adhesive. The machining difficulty of the through shaft is lower than that of the stepped shaft, and the machining accuracy is higher than that of the stepped shaft, and it can avoid the undercut caused by the stepped shaft and other local features that are prone to stress concentration, and improve the stiffness and strength of the shaft.

Further, the rolling body and the shaft are made of metal. The bearing assembly made of metal can run stably at a working speed of 150,000 rpm, which is economical.

Further, the rotation shaft is made of metal, and the rolling body is made of ceramic. The metal through shaft with a diameter of 5 mm has a certain rigidity, which can be applied to the design requirements of most small high-speed fans. The bearing assembly with ceramic ball can run stably at the working speed of 160000 rpm~170000 rpm, which can increase the limit speed, and at the same time has a certain economic efficiency.

The two sets of the rolling bodies have the same number of rolling sub-body; the number of rolling sub-body is 6 or 7.

In any of the above-mentioned embodiments, the diffuser further comprises: a bearing seat, being sleeved on the bushing and accommodated in the first installation cavity, the bearing seat being connected with the first protrusion, and at least part of the bearing seat extending into the second installation cavity.

In this embodiment, the diffuser further comprises a bearing seat, the bearing seat is sleeved on the bushing, the diffuser is connected to the rotation shaft through the bearing seat, and at least part of the bearing seat extends into the second installation cavity.

In any of the above-mentioned embodiments, a bead is provided between the bearing seat and the inner ring arm.

In this embodiment, a number of beads are evenly distributed along the circumferential direction between the bearing seat and the inner ring arm to improve the reliability of the connection.

In any of the above-mentioned embodiments, the first protrusion, the inner ring arm, the outer ring arm and the bearing seat are an integrated structure.

In this embodiment, the coaxiality between the impeller and the wind hood must be guaranteed by the dimensional chain between the bearing assembly, the bearing seat, the first notch of the diffuser and the second notch of the wind hood. The coaxiality will directly affect the uniformity of the tip gap between the impeller and the wind hood, thereby affecting the efficiency. The bearing seat, the inner ring arm, the outer ring arm and other features are integrated as a diffuser, so that the above-mentioned dimensional chain can be concentrated on as few matching parts as possible, thereby ensuring assembly and high efficiency.

In any of the above-mentioned embodiments, the rotor comprises: a magnetic ring, being sleeved outside the rotation shaft; and a protective sheath, being sleeved outside the magnetic ring, wherein, there is a gap between the magnetic ring and the bushing along an axial direction of the rotation shaft.

In this embodiment, the rotor includes a magnetic ring formed into a ring, and a protective sheath fixedly sleeved on the outer peripheral surface of the magnetic ring. The magnetic ring and the shaft are fixedly connected under the bearing assembly, and there is a gap between the magnetic ring and the bushing to prevent the rolling body from being magnetized and affecting its service life.

In any of the above-mentioned embodiments, the gap is greater than or equal to 3 mm.

In this embodiment, keep an axial distance of at least 3 mm between the end surface of the magnetic ring and the end surface of the bushing to prevent the rolling body from being magnetized, thereby affecting the life of the bearing assembly.

Further, the protective sheath has an integrally formed strengthening portion and balanced portion. For example, the strengthening portion is mainly arranged on the outer circumferential surface of the magnetic ring, has a thickness of 0.2 mm~0.3 mm, and is fixed on the end surface of the magnetic ring through a spinning process to protect the magnetic ring from disintegration during high-speed operation. The balanced portion is arranged on another end of the magnetic ring away from the spinning part, and has a thickness of about 1 mm, which plays a role of balance and weight removal. The integrated design of the protective sheath structure can reduce the number of parts, simplify the assembly process, and reduce costs.

The balanced portion is arranged on one side away from the bushing. In other words, the balanced portion is arranged at the end of the rotor. The balanced portion away from the center of gravity of the rotor is convenient for deduplication and can improve the efficiency and reliability of deduplication.

The balanced portion is arranged on one side adjacent to the bushing. In other words, the balanced portion is arranged between the bearing and the magnetic ring. The balanced portion adjacent to the center of gravity of the rotor can shorten the axial length and make full use of the axial space.

The protective sheath is a non-magnetic material.

In any of the above-mentioned embodiments, the fan further comprises a frame, being connected to the diffuser, and arranged adjacent to the air outlet, the stator assembly being connected to the bearing seat through the frame, and a first flow path being formed between the stator assembly and the frame, and a second flow path being formed between the stator assembly and the rotor, the first flow path and the second flow path being communicated with the wind tunnel.

In this embodiment, the stator assembly is arranged on the radial outer side of the rotor and is fixedly connected to the bearing seat through the frame. The stator assembly is fixedly arranged on the axial lower side of the diffuser, and at least part of the stator assembly is located in the wind tunnel to improve the heat dissipation effect of the stator assembly. At the same time, there is a first flow path between the stator assembly and the frame, and a second flow path between the stator assembly and the rotor. The first flow path and the second flow path are communicated to the wind tunnel to cool the heating components on the flow path.

For example, the stator assembly includes a ring-shaped stator yoke and a number of stator teeth that are arranged at intervals in the circumferential direction inside the stator yoke and extend radially inward. The stator teeth are formed as an inner surface on the radial inner side, which is in clearance fit with the outer diameter of the rotor, and is arranged corresponding to the rotor in the axial direction. The stator assembly further comprises a winding wound on the yoke. The maximum diameter of the winding is smaller than the maximum diameter of the wind tunnel, and the minimum diameter is larger than the inner surface of the stator teeth.

Further, the frame has a ring-shaped shell arranged axially below the outer ring arm, and the shell is provided with a stator installation portion, and the stator assembly is fixed and housed inward. A first flow path is formed between the inner wall of the shell and the winding, which is used to draw the fluid in the wind tunnel out of the fan, while cooling the stator devices on the flow path. At the same time, the space between the stator and the rotor forms a second flow path. The second flow path is communicated and connected to the wind tunnel through the upper space of the stator assembly, and the fluid in the wind tunnel is introduced between the stator assembly and the rotor to cool the heating parts on the flow path.

In any of the above-mentioned embodiments, the fan further comprises a control board, being arranged at one end of the stator assembly away from the diffuser, and at least part of the control board is located in the first flow path and the second flow path.

In this embodiment, the air flow in the wind tunnel cools the components on the stator assembly and the rotor and the electric control board through the first flow path and the second flow path. At the same time, the first flow path and the second flow path are located below the wind tunnel. In other words, the high-speed gas is introduced to other heating components for cooling after the completion of the expansion, so it will not affect the state of the airflow in the wind tunnel, thus achieving a good heat dissipation design of the whole machine while ensuring the efficiency.

According to the second aspect of the present disclosure, an electric appliance is also provided, including the fan provided by any one of the above-mentioned embodiments in the first aspect.

The electric appliance provided in the second aspect of the present disclosure includes the fan proposed by any one of the above-mentioned embodiments, so it has all the beneficial effects of the fan.

For example, the electric appliance can be a vacuum cleaner or an air conditioner.

Additional aspects and advantages of the present disclosure will become apparent in the following description or will be learned by practice of the present disclosure.

BRIEF DESCRIPTION OF THE DRAWINGS

The above and/or additional aspects and advantages of the present disclosure will become apparent and readily understood from the description of embodiments in conjunction with the following drawings.

Figure 1:
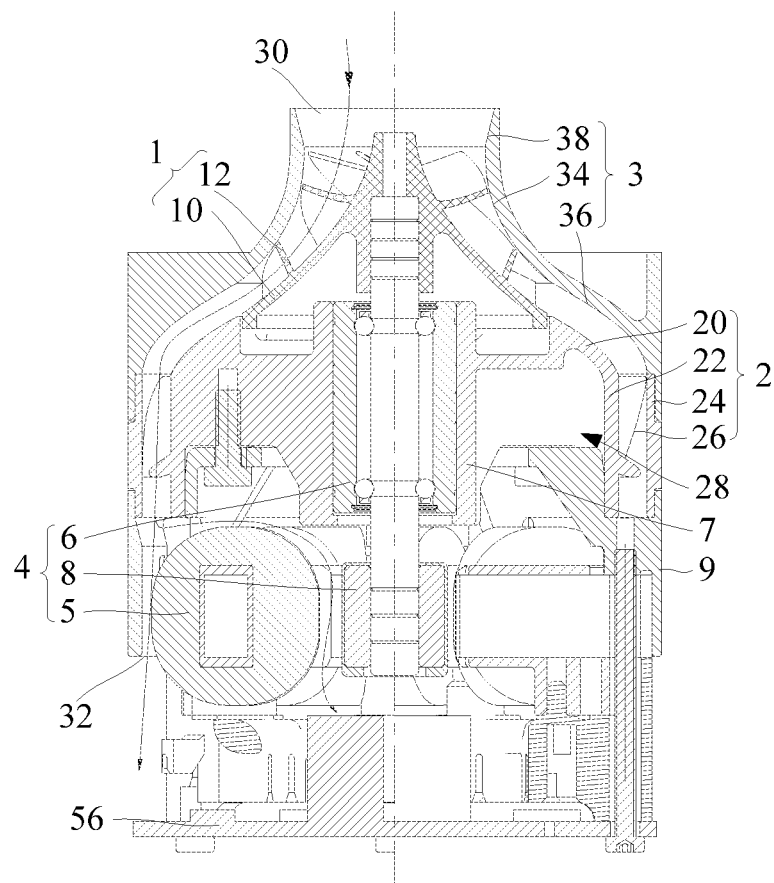
FIG. 1 shows a cross-sectional view of a fan according to an embodiment of the present disclosure.

The reference numbers in FIGS. 1-10 are described as follows:

1 impeller, 10 cover plate, 100 second installation cavity, 12 second blade, 120 front edge, 122 rear edge, 124 second inner end point, 126 second outer end point, 14 protrusion portion, 16 installation portion, 160 installation hole, 162 through hole, 2 diffuser, 20 first protrusion, 22 inner ring arm, 24 outer ring arm, 240 first notch, 26 first blade, 260 inlet end, 262 outlet end, 264 first inner end point, 266 first outer end point, 28 first installation cavity, 3 wind hood, 30 air inlet, 32 air outlet, 34 first inner wall surface, 36 second inner wall surface, 360 second notch, 38 collecting surface, 4 driving structure, 5 stator assembly, 50 stator yoke, 52 stator teeth, 54 winding, 56 control board, 6 bearing assembly, 60 bushing, 62 rolling body, 64 first outer ring, 66 second outer ring, 68 rotation shaft, 7 bearing seat, 70 bead, 8 rotor, 80 magnetic ring, 82 protective sheath, 820 strengthening portion, 822 balanced portion, 9 frame, 90 shell.

DETAILED DESCRIPTION OF EMBODIMENTS

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

A fan and an electric appliance according to some embodiments of the present disclosure are described below with reference to FIGS. 1 to 10.

According to an embodiment of the first aspect of the present disclosure, the present disclosure provides a fan, comprising a driving structure 4, an impeller 1, a wind hood 3, and a diffuser 2. The impeller 1 includes a cover plate 10, the cover plate 10 being installed on the driving structure 4, the cover plate 10 being recessed in an axial direction of the impeller 1, and a diameter of the cover plate 10 gradually increasing along an air inlet direction. The wind hood 3 is covered on the impeller 1, and an air inlet 30 and an air outlet 32 communicated to the air inlet 30 are provided on the wind hood 3. The diffuser 2 is located at one end of the impeller 1 facing the air outlet 32, and the diffuser 2 includes a first protrusion 20 connected to the driving structure 4. The first protrusion 20 protrudes in a direction of the wind hood 3, and a diameter of one end of the first protrusion 20 adjacent to the cover plate 10 is smaller than a diameter of one end away from the cover plate 10. The diffuser 2 also includes an inner ring arm 22 connected to the first protrusion 20 and an outer ring arm 24 sleeved outside the inner ring arm 22, and the outer ring arm 24 is smoothly and transitionally connected to the wind hood 3. The first protrusion 20, the inner ring arm 22, and the outer ring arm 24 are coaxially arranged. The wind hood 3, the cover plate 10, and the diffuser 2 defines a wind tunnel. The wind tunnel includes a variable section portion and an equal section portion, the variable section portion is arranged adjacent to the air inlet 30, and the equal section portion is arranged adjacent to the air outlet 32.

As shown in FIG. 1, the driving structure 4 drives the impeller 1 to rotate so that the airflow flows from the air inlet 30 to the air outlet 32. The first protrusion 20 is arranged adjacent to the impeller 1. The inner ring arm 22 is connected with the first protrusion 20 and is located below the first protrusion 20. The outer ring arm 24 and the inner ring arm 22 are sleeved together. The first protrusion 20 protrudes toward the wind hood 3, and the diameter of the first protrusion 20 gradually increases. The wind hood 3, the cover plate 10 and the diffuser 2 define the wind tunnel, and the airflow flows from the air inlet 30 to the air outlet 32 through the wind tunnel, and the space formed between the impeller 1 and the wind hood 3 changes the direction and kinetic energy of the fluid. When the airflow passes through the wind tunnel formed between the first protrusion 20 and the wind hood 3, the dynamic pressure is converted into static pressure. At the same time, the airflow is directed radially outward and downward, and finally the airflow is led out of the wind tunnel through the annular air cavity composed of the inner ring arm 22 and the outer ring arm 24. The airflow in the entire wind tunnel is very smooth, reducing impact loss and separation loss. The wall of the wind hood 3 and the wall of the diffuser 2 are smoothly and transitionally connected. In other words, the diameter of the connecting part between the wall of the wind hood 3 and the wall of the diffuser 2 is the same. Further, the inner wall surface of the wind hood 3 and the inner wall surface of the diffuser 2 are smoothly and transitionally connected, so that the airflow does not produce impact when passing through the joint between the wind hood 3 and the diffuser 2, thereby reducing the impact loss at the connection and improving the efficiency of the fan.

Further, the wind tunnel includes a variable section portion and an equal section portion, the variable section portion is adjacent to the air inlet 30, and the equal section portion is adjacent to the air outlet 32. Along the air inlet direction, the cross-sectional area of the variable section portion gradually decreases, and the cross-sectional area of the equal section portion remains unchanged. The variable section portion and the equal section portion are smoothly and transitionally connected to make the airflow in the wind tunnel very smooth, reducing impact loss and separation loss.

Further, the space between the impeller 1 and the wind hood 3 constitutes a variable section portion, and the space between the diffuser 2 and the wind hood 3 constitutes an equal section portion.

Further, the air flow enters the wind tunnel from the air inlet 30 roughly along the axial direction of the driving structure 4, and the distance between the center line of the wind tunnel and the axis of the driving structure 4 gradually increases, so that the airflow is gradually guided to the radial outside and below the driving structure 4 when passing through the wind tunnel.

Further, the wind hood 3, the impeller 1 and the diffuser 2 are coaxially arranged, and the wall surface of the first protrusion 20 toward the wind hood 3 is a smooth convex surface with a gradually increasing diameter.

For example, the direction shown by the arrow in FIG. 1 is the flow direction of the airflow.

In any one of the above-mentioned embodiments, the driving structure 4 can further comprise a stator assembly 5, which is arranged relative to the air outlet 32, so that the wind flow from the air outlet 32 blowing directly to the stator assembly 5.

In this embodiment, the driving structure 4 includes the stator assembly 5, the stator assembly 5 is arranged at the air outlet 32, and the wind flow from the air outlet 32 is directly blown to the stator assembly 5, which improves the heat dissipation effect of the stator assembly 5.

In any one of the above-mentioned embodiments, an angle between an extension direction of one end of the cover plate 10 toward the first protrusion 20 and an extension direction of one end of the first protrusion 20 toward the cover plate 10 is less than or equal to a first threshold.

In this embodiment, the angle between the extension direction of one end of the cover plate 10 facing the first protrusion 20 and the extension direction of one end of the first protrusion 20 facing the cover plate 10 is less than or equal to the first threshold. In other words, in the two ends of the cover plate 10 and the first protrusion 20 that are adjacent to each other, the angle between the tangent of the end circumference of the first protrusion 20 and the tangent of the end circumference of the cover plate 10 is less than or equal to the first threshold. Therefore, the angle between the flow direction when the airflow through the cover plate 10 toward the end of the first protrusion 20 and the flow direction when the airflow through the first protrusion 20 toward the end of the cover plate 10 is less than or equal to the first threshold. The value of the first threshold can be between −2° and 2°, and the first threshold can also be other smaller angles. In other words, the end of the first protrusion 20 is roughly arranged in the tangential direction of the end of the cover plate 10, which makes the transition between the first protrusion 20 and the end of the cover plate 10 smoother. When the airflow passes through the junction between the first protrusion 20 and the cover plate 10, the impact loss is greatly reduced, thereby improving the efficiency of the fan.

Further, the diameter of the end of the first protrusion 20 facing the air inlet 30 is greater than or equal to the diameter of the end of the impeller 1 facing the air outlet 32. In other words, in the two ends of the first protrusion 20 and the impeller 1 adjacent to each other, the end of the first protrusion 20 is larger than the end of the impeller 1, so that the airflow is gradually directed to the radial outside and below of the driving structure 4 when the airflow from the impeller 1 to the first protrusion 20.

In any one of the above-mentioned embodiments, one end of the first protrusion 20 facing the air inlet 30 is provided with a ring-shaped depression, and one end of the cover plate 10 facing the diffuser 2 is provided with a ring-shaped protrusion portion 14, and the depression is in clearance fit with the protrusion portion 14.

As shown in FIG. 1, in this embodiment, a depression is arranged on the first protrusion 20, and a protrusion portion 14 is arranged on the cover plate 10. The depression is adapted to the protrusion portion 14. Since the cover plate 10 rotates at a high speed and the diffuser 2 is fixed, the two must be in clearance fit. Further, the gap between the depression and the protrusion portion 14 is less than the predetermined threshold. In other words, there is a small gap fit between the depression and the protrusion portion 14. When the fluid flows from the cover plate 10 to the first convex surface, it will inevitably enter the gap between the two and cause leakage loss. A small clearance fit can reduce this leakage and improve efficiency. At the same time, the protrusion portion 14 is located below the cover plate 10, which can be used as the balance ring of the cover plate 10 to balance and remove the weight. It is no longer necessary to arrange the balance ring of the cover plate 10 separately, which reduces the number of parts, simplifies the assembly process, and reduces the cost.

In any one of the above-mentioned embodiments, a diameter of a joint between the first protrusion 20 and the inner ring arm 22 is the same as a diameter of an outer wall surface of the inner ring arm 22 and is smoothly and transitionally connected.

In this embodiment, the diameter of the joint between the first protrusion 20 and the inner ring arm 22 is the same as the diameter between the outer wall surfaces of the inner ring arm 22. Further, the joint between the first protrusion 20 and the inner ring arm 22 is smoothly and transitionally connected, thereby reducing the impact loss when the airflow through the joint between the first protrusion 20 and the inner ring arm 22, thereby improving the working efficiency of the fan.

In any one of the above-mentioned embodiments, one side of the outer ring arm 24 away from an axis of the driving structure 4 is provided with a first notch 240, and one side of the wind hood 3 facing an axis of the driving structure 4 is provided with a second notch 360 adapted to the first notch 240, the first notch 240 and the second notch 360 are both ring-shaped, and one side of the outer ring arm 24 facing the air inlet 30 abuts against a bottom of the second notch 360.

Figure 2:
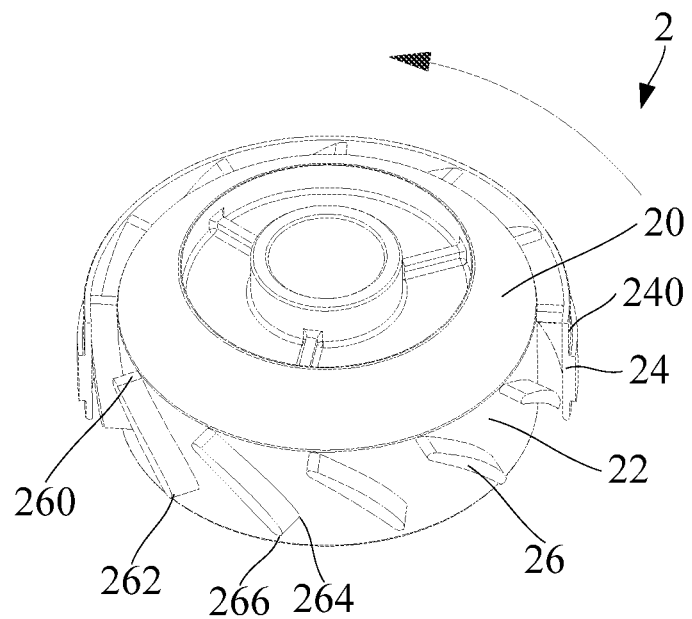
FIG. 2 shows a structural schematic diagram of a diffuser of an embodiment of the present disclosure.

As shown in FIG. 2, in this embodiment, the outer ring arm 24 is provided with the first notch 240, and the inner side corresponding to the wind hood 3 is provided with a second notch 360. The first notch 240 matches the second notch 360. Further, the depth of the second notch 360 along the radial direction of the first protrusion 20 is equal to the remaining thickness of the outer ring arm 24 after the first notch 240 is arranged, so that the connected wind hood 3 and the outer ring arm 24 are smoothly and transitionally connected. At the same time, through the cooperation of the first notch 240 and the second notch 360, the radial positioning of the wind hood 3 and the diffuser 2 is realized, and the coaxiality of the diffuser 2 and the wind hood 3 is ensured.

Further, the first notch 240 and the second notch 360 are all ring-shaped, and one side of the outer ring arm 24 facing the air inlet 30 abuts on the bottom of the second notch 360.

In this embodiment, the first notch 240 and the second notch 360 are all ring-shaped, which improves the reliability of the joint between the diffuser 2 and the wind hood 3. One side of the outer ring arm 24 facing the air inlet 30 abuts on the bottom of the second notch 360. In other words, the top of the outer ring arm 24 abuts on the groove bottom of the second notch 360, which realizes the axial positioning of the diffuser 2 and the wind hood 3. At the same time, it also ensures the smooth and transitional joint between the inner wall surface of the wind hood 3 and the inner wall surface of the outer ring arm 24, ensuring the smoothness of the medium flow.

In any one of the above-mentioned embodiments, the diffuser 2 further comprises a first blade 26. The first blade 26 is arranged between the inner ring arm 22 and the outer ring arm 24, and both ends of the first blade 26 along a radial direction of the diffuser 2 are respectively being attached to the inner ring arm 22 and the outer ring arm 24, so that the first blade 26, the inner ring arm 22 and the outer ring arm 24 constitute an air guiding cavity. The first blade 26 is in a spiral shape, the first blade 26 includes an inlet end 260 and an outlet end 262 along the air inlet direction, and the inlet end 260 is located behind the outlet end 262 along a rotation direction of the impeller 1.

Figure 3:
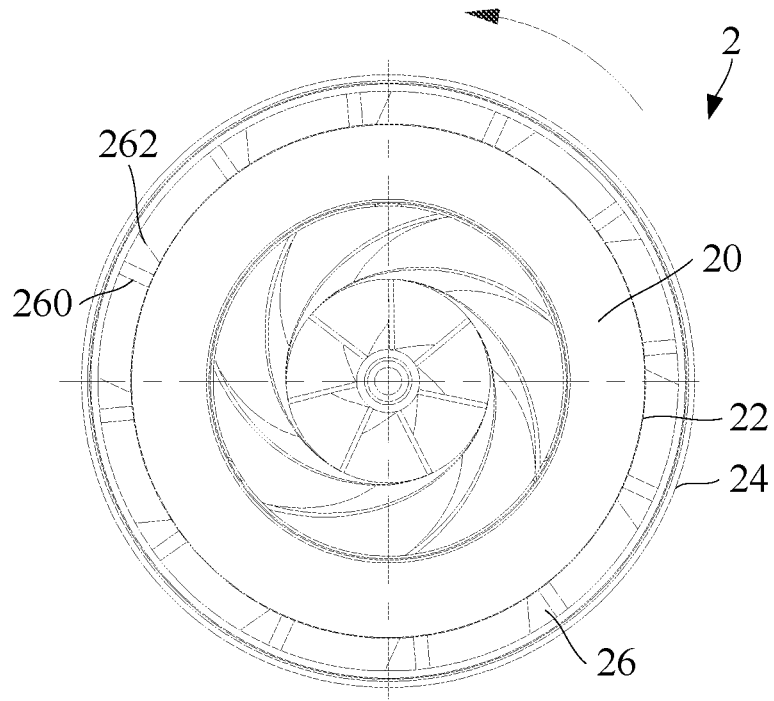
FIG. 3 shows another structural schematic diagram of a diffuser of an embodiment of the present disclosure.

As shown in FIGS. 2 and 3, in this embodiment, the diffuser 2 further comprises the first blade 26, and the first blade 26 is arranged between the inner ring arm 22 and the outer ring arm 24. The two ends of the first blade 26 along the radial direction of the diffuser 2 are attached to the inner ring arm 22 and the outer ring arm 24 respectively. In other words, the first blade 26 extends in a direction toward the axis of the diffuser 2 to the inner ring arm 22, and extends in a direction away from the axis of the diffuser 2 to the outer ring arm 24, so that the root of the first blade 26 is attached to the inner ring arm 22 and the top is attached to the outer ring arm 24. Thus, an air guiding cavity is formed between the inner ring arm 22, the first blade 26, and the outer ring arm 24. The air guiding cavity formed by the ring space between the inner ring arm 22, the outer ring arm 24 and the first blade 26 is relatively closed. After the airflow enters the air guiding cavity, it only flows out from the outlet of the air guiding cavity, which avoids the efficiency loss caused by the seal leakage of the first blade 26 during the expansion process, and also simplifies the assembly process. The first blade 26 is in a spiral shape, and the inlet end 260 is located after on the outlet end 262 along the rotation direction of the impeller 1, which is beneficial to reduce the loss of airflow along the way and the impact loss of the outlet end 262.

In any one of the above-mentioned embodiments, the first blade 26 is completely located in an air cavity between the inner ring arm 22 and the outer ring arm 24.

In this embodiment, the first blade 26 is completely located in the air guiding cavity in the axial direction. In other words, the first blade 26 is completely located in the annular air cavity composed of the inner ring arm 22 and the outer ring arm 24, which can ensure the uniformity of the airflow of the inlet end 260 and the outlet end 262 of the first blade 26, and avoid the influence of other structures on airflow.

In any one of the above-mentioned embodiments, the extension direction of the inlet end 260 is the extension direction of the inlet end 260 from the inner ring arm 22 to the outer ring arm 24. The angle between the extension direction of the inlet end 260 and the radial direction of the inner ring arm 22 is less than or equal to the second threshold. The value range of the second threshold depends on the specific situation, such as −2° to 2° or other suitable values. In other words, the inlet end 260 is roughly arranged in the direction of the radial extension of the inner ring arm 22. The first inner end point 264 of the outlet end 262 is located in front of the first outer end point 266. In other words, the first inner end point 264 is in front of the first outer end point 266.

As shown in FIG. 2, in this embodiment, the extension direction of the inlet end 260 is the extension direction of the inlet end 260 from the inner ring arm 22 to the outer ring arm 24. The angle between the extension direction of the inlet end 260 and the radial direction of the inner ring arm 22 is less than or equal to the second threshold. The value range of the second threshold depends on the specific situation, such as −2° to 2° or other suitable values. In other words, the inlet end 260 is roughly arranged in the direction of the radial extension of the inner ring arm 22. The first inner end point 264 of the outlet end 262 is located in front of the first outer end point 266. In other words, the first inner end point 264 is in front of the first outer end point 266.

In any one of the above-mentioned embodiments, along an axial direction of the diffuser 2, the inlet end 260 is a smooth curved surface convex in a direction of the impeller 1, and the outlet end 262 is a smooth curved surface convex in a direction away from the impeller 1, along a rotation direction of the impeller 1, in two sides of the first blade 26, a front side is convex toward the rotation direction of the impeller 1, and a rear side is recessed toward the rotation direction of the impeller 1.

In this embodiment, along the axial direction of the diffuser 2, the inlet end 260 is a smooth surface convex toward the impeller 1 direction, and the outlet end 262 is a smooth surface convex toward the direction away from the impeller 1, which ensures the uniformity of the airflow of the inlet end 260 and reduces the impact loss of the outlet end 262. Along the rotation direction of the impeller 1, the two sides of the first blade 26 are located on the front side. In other words, the pressure surface of the first blade 26 is recessed toward the rotation direction of the impeller 1 and is located on the rear side. In other words, the back pressure surface of the first blade 26 is recessed toward the rotation direction of the impeller 1, which helps to reduce the loss of airflow along the way, which in turn helps to improve the efficiency of the fan.

In any one of the above-mentioned embodiments, the inner ring arm 22, the first blade 26 and the outer ring arm 24 are integrated structure.

In this embodiment, the inner ring arm 22 and the outer ring arm 24 are circular rings, and the outer ring arm 24 is arranged on the radial outside of the inner ring arm 22. The spiral first blade 26 is arranged between the inner ring arm 22 and the outer ring arm 24, and is connected with the inner ring arm 22 and the outer ring arm 24 to form an integral part. Since the two ends of the first blade 26 along the radial direction of the inner ring arm 22 are respectively attached to the inner ring arm 22 and outer ring arm 24; the first blade 26, the inner ring arm 22 and the outer ring arm 24 can be easily molded as an integral part. Therefore, it is not necessary to make the first blade 26 and one of the inner ring arm 22 and the outer ring arm 24 be integrally formed and then be assembled and connected with another one. The setting of the integrated diffuser 2 can form a sealed air guiding cavity between the oppositely arranged cylindrical surface of the inner ring arm 22 and the outer ring arm 24, and the pressure surface and the back pressure surface of the two adjacent first blades 26. The efficiency loss caused by the leakage of the first blade 26 during the expansion process is avoided, and the assembly process is also simplified.

In any one of the above-mentioned embodiments, the number of the first blade 26 is multiple, and the multiple first blades 26 are evenly distributed between the inner ring arm 22 and the outer ring arm 24 along a circumference of the inner ring arm 22.

In this embodiment, the number of the first blade 26 is multiple, and the multiple first blades 26 are evenly distributed between the inner ring arm 22 and the outer ring arm 24 along a circumference of the inner ring arm 22. Further, the number of the first blades 26 is 12.

In any one of the above-mentioned embodiments, the impeller 1 further comprises a second blade 12, being arranged on the cover plate 10, and located in the wind tunnel. The second blade 12 includes a front edge 120 adjacent to the air inlet 30 and a rear edge 122 adjacent to the air outlet 32 along the air inlet direction, and the front edge 120 is located in front of the rear edge 122 along the rotation direction of the impeller 1.

Figure 4:
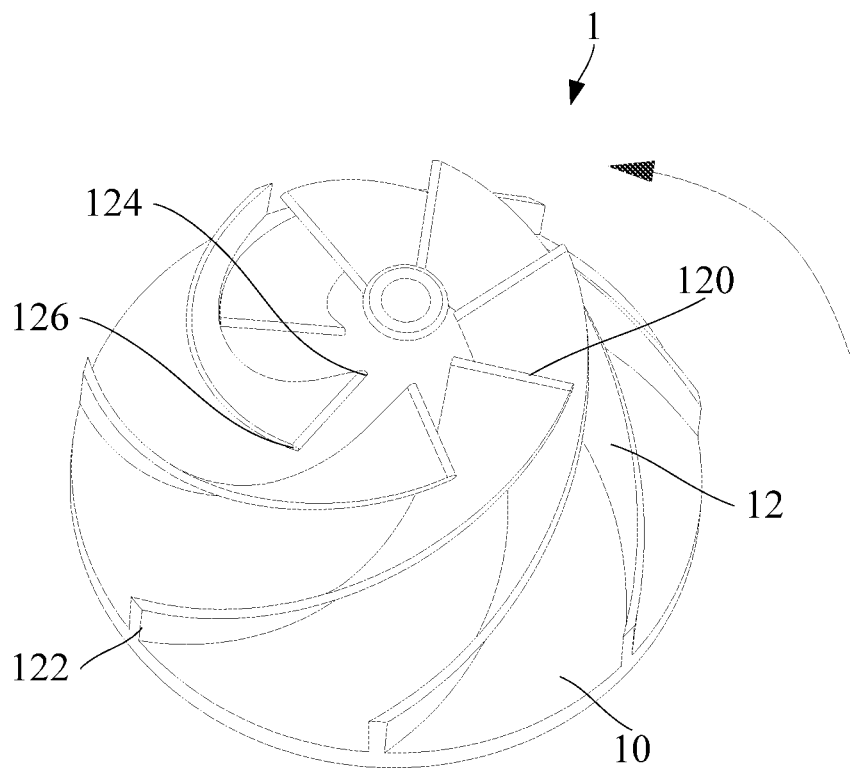
FIG. 4 shows a structural schematic diagram of an impeller of an embodiment of the present disclosure.

As shown in FIG. 4, in this embodiment, the impeller 1 further comprises a second blade 12, and the outer wall surface of the cover plate 10 is a smooth concave surface. The airflow enters the wind tunnel from the air inlet 30 to obtain a more uniform flow field, and then enters the independent flow channel space composed of two adjacent second blades 12 through the front edge 120. This avoids the influence of the flow field change at the inlet end 260 on the fluid movement between the second blades 12. The front edge 120 is located in front of the rear edge 122, so that the extension direction of the flow channel space between two adjacent second blades 12 is the same as the rotation direction of the impeller 1.

Further, the second blade 12 intersects with the outer wall surface of the cover plate 10 to form the root of the blade, and the second blade 12 extends in the direction away from the outer wall surface of the cover plate 10 and forms the top of the blade at the largest outer diameter.

In any one of the above-mentioned embodiments, along the air inlet direction, the diameter of the cover plate 10 gradually increases.

In this embodiment, along the air inlet direction, the diameter of the cover plate 10 gradually increases. Further, the outer wall surface of the cover plate 10 is a smooth concave surface with a gradually increasing diameter.

In any one of the above-mentioned embodiments, an angle α between an extension direction of the front edge 120 and an axial direction of the driving structure 4 is within a range of 76°±2°, the rear edge 122 is located on a cylindrical surface formed by an outer side wall of the protrusion portion 14.

Figure 8:
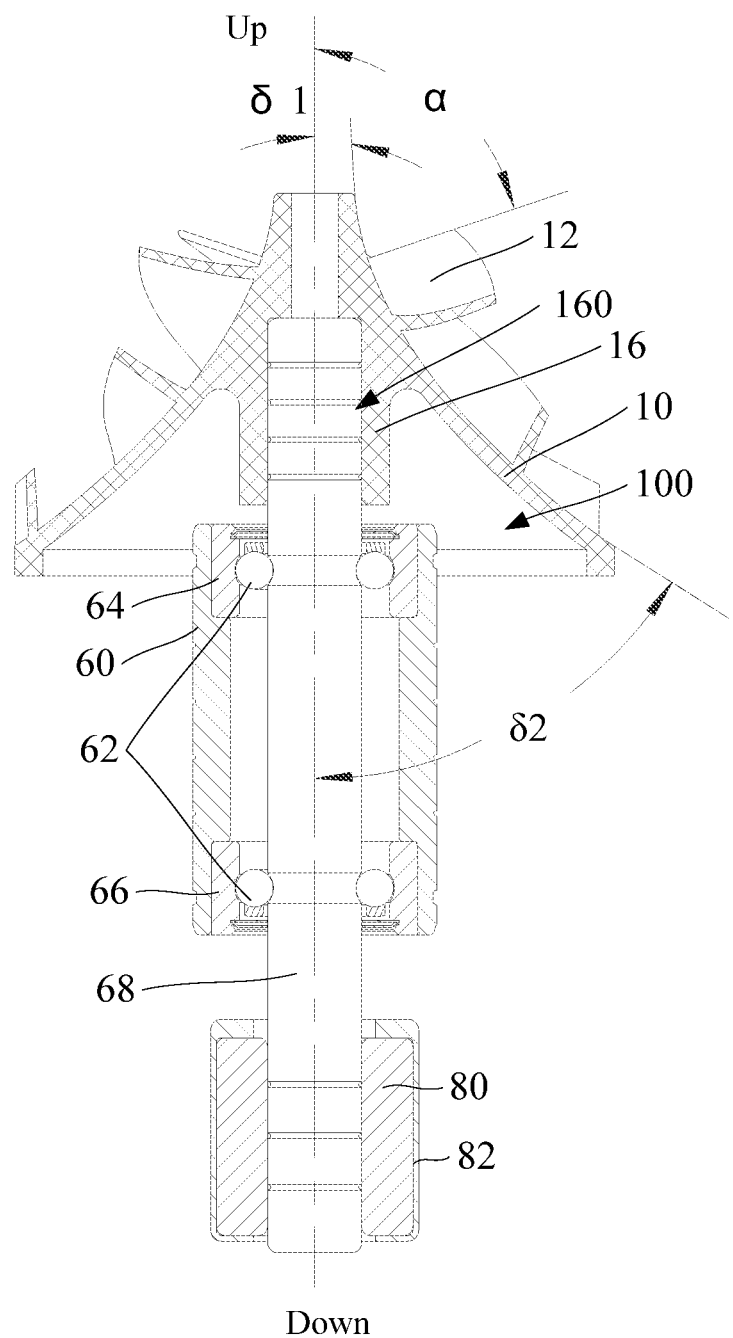
FIG. 8 shows a cross-sectional view of a partial structure of a fan of another embodiment of the present disclosure.

As shown in FIG. 8, in this embodiment, the angle α between the imaginary straight line where the front edge 120 is located and the axis of the cover plate 10 is within the range of 76°±2°, so that the front edge 120 is arranged roughly along the radial direction of the cover plate 10. For example, the angle between the imaginary straight line where the front edge 120 is located and the axis of the cover plate 10 is greater than or equal to 74° and less than or equal to 78°; the rear edge 122 is located on the cylindrical surface formed by the outer wall surface of the protrusion portion 14, thereby reducing the impact loss when the airflow through the rear edge 122.

In any one of the above-mentioned embodiments, the front edge 120 includes a second inner end point 124 connected to the cover plate 10 and a second outer end point 126 away from the cover plate 10. The second outer end point 126 is located at the front of the second inner end point 124 along a rotation direction of the impeller 1. The second inner end point 124 is located below the second outer end point 126, and the second outer end point 126 is located at an end of the cover plate 10 facing the air inlet 30 and below the air inlet 30, in a direction from the air outlet 32 to the air inlet 30. The rear edge 122 includes a third inner end point connected to the cover plate 10 and a third outer end point away from the cover plate 10, and the third inner end point is located on a circumferential line of the impeller 1 facing one end of the diffuser 2. In a direction from the air outlet 32 to the air inlet 30, the third outer end point is located above the third inner end point.

As shown in FIGS. 4 to 7, in this embodiment, since the front edge 120 starts from the root of the front edge 120 and extends to the radial outside and above the cover plate 10, when the airflow flows into the flow channel formed by the second blade 12, it flows in an oblique direction, which effectively controls the air volume and pressure of the front edge 120, and reduces the fluid loss of the front edge 120. At the same time, the second outer end point 126 is arranged above the second inner end point 124 to ensure that the streamline length at the top of the second blade 12 is slightly larger than the streamline length at the root of the second blade 12, so that the airflow has a more uniform flow state at the rear edge 122. For example, the second inner end point 124 and the second outer end point 126 are the two end points at the junction of the pressure surface and the back pressure surface of the second blade 12 and the cover plate 10. The second outer end point 126 is located at the end of the cover plate 10 facing the air inlet 30 and below the air inlet 30, avoiding air leakage losses into the wind tunnel. The joint between the rear edge 122 and the cover plate 10 is located on the circumference of the impeller 1 facing one end of the diffuser 2, so that the airflow smoothly flows out of the flow channel formed by the second blade 12. The third outer end point is located above the third inner end point, and the inclination angle of the rear edge 122 is arranged reasonably to help reduce the fluid loss at the outlet end 262.

The extension direction of the front edge 120 is the connection direction between the second inner end point 124 and the second outer end point 126, and the extension direction of the rear edge 122 is the extension direction from the root of the rear edge 122 to the top of the rear edge 122.

In any one of the above-mentioned embodiments, in a projection of the impeller 1 on a plane perpendicular to an axis of the driving structure 4, an angle γ1 between a line between the second inner end point 124 and an axis of the driving structure 4 and a line between the second outer end point 126 and an axis of the driving structure 4 is greater than or equal to 0° and less than or equal to 5°.

Figure 5:
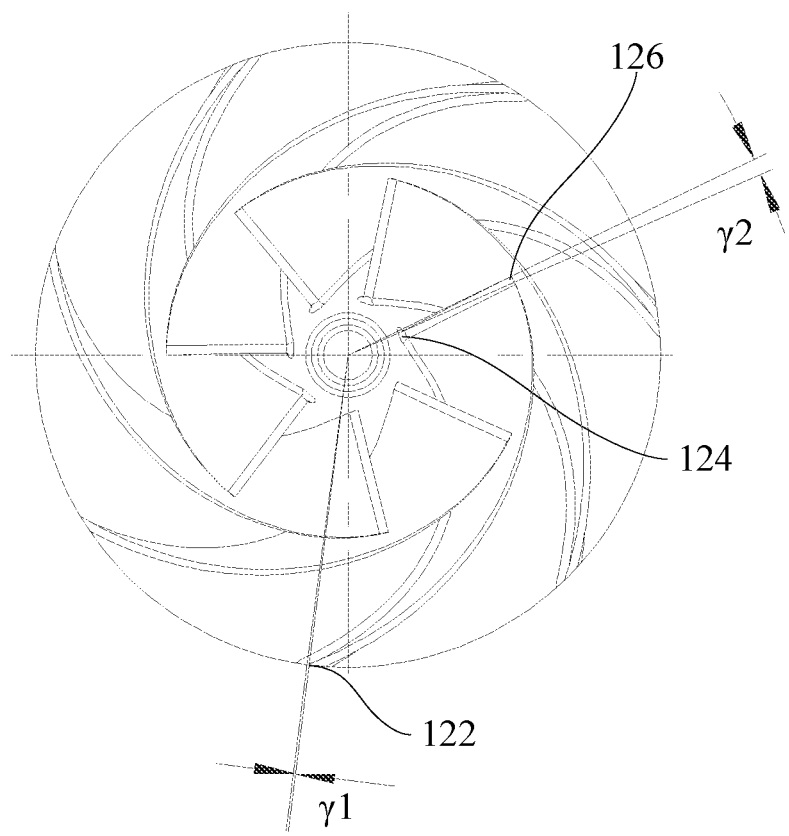
FIG. 5 shows another structural schematic diagram of an impeller of an embodiment of the present disclosure.

As shown in FIG. 5, in this embodiment, the angle γ1 between the line connecting the second inner end point 124 and the shaft center and the line connecting the second outer end point 126 and the shaft center is greater than or equal to 0° and less than or equal to 5°. The small front angle at the top of the front edge 120 is conducive to fitting fluid drainage, while ensuring that the impeller 1 is manufacturable.

In any one of the above-mentioned embodiments, in a projection of the impeller 1 on a plane perpendicular to an axis of the driving structure 4, an angle γ2 between a line between the third inner end point and an axis of the driving structure 4 and a line between the third outer end point and an axis of the driving structure 4 is greater than or equal to −2° and less than or equal to 2°.

As shown in FIG. 5, in this embodiment, by setting the inclination angle of the rear edge 122 reasonably, it is beneficial to reduce the fluid loss at the outlet of the impeller 1, reduce the gap leakage at the outlet of the impeller 1, reduce the existence of secondary flow and jet wake at the outlet of the impeller 1, and improve the efficiency of the impeller 1. The angle γ2 between the line connecting the third inner end point and the axis of the driving structure 4 and the line connecting the third outer end point and the axis of the driving structure 4 is greater than or equal to −2° and less than or equal to 2°. In other words, the top of the rear edge 122 is roughly set in the axial direction of the root of the rear edge 122.

In any one of the above-mentioned embodiments, the front edge 120 protrudes toward a direction of the air inlet 30, and a length of the rear edge 122 is less than a length of the front edge 120.

In this embodiment, the front edge 120 is convex toward the air inlet 30 and is a smooth curved surface, smoothly connecting the pressure surface and the suction surface. The second blade 12 extends toward the air inlet 30 and becomes thinner, which can increase the length of the second blade 12 while reducing the relative diffusion speed. The length of the rear edge 122 is less than the length of the front edge 120, which can effectively control the ratio of the inlet and outlet areas of the flow channel between adjacent second blades 12, reduce the diffusion loss of the flow, broaden the range of the high-efficiency zone under small flow conditions, and reduce aerodynamic noise.

In any one of the above-mentioned embodiments, the ratio of the length of the rear edge 122 to the length of the front edge 120 is greater than or equal to 0.4 and less than or equal to 0.46.

In this embodiment, by setting the length of the rear edge 122 reasonably, it is beneficial to reduce the fluid loss at the outlet end 262, reduce the gap leakage of the impeller 1 outlet, reduce the existence of secondary flow and jet wake at the impeller 1 outlet, and improve the efficiency of the impeller 1. The ratio of the length of the rear edge 122 to the length of the front edge 120 is greater than or equal to 0.4 and less than or equal to 0.46.

Further, the thickness of the front edge 120 is smaller than that of the rear edge 122.

In any one of the above-mentioned embodiments, there is a first gap between one end of the second blade 12 away from an axis of the impeller 1 and the inner wall surface of the wind hood 3. The first gap is arranged equidistantly in a direction from the air inlet 30 to the air outlet 32, or the first gap is gradually reduced in a direction from the air inlet 30 to the air outlet 32.

In this embodiment, since the impeller 1 and the wind hood 3 rotate at a relatively high speed, there is a need for clearance fit between the two to ensure that the gap is gradually reduced from top to bottom or set at an equal distance from top to bottom, which can effectively improve the efficiency of the fan.

In any one of the above-mentioned embodiments, the first gap is greater than or equal to 0.2 mm and less than or equal to 0.3 mm.

In this embodiment, if the first gap is too large, it will seriously affect the efficiency of the wind tunnel. If the first gap is too small, it will greatly increase the difficulty of assembly. The most suitable first gap is between 0.2 mm~0.3 mm. At the same time, since the length of the front edge 120 is greater than the length of the rear edge 122, the first gap at the rear edge 122 will have a greater impact on efficiency than at the front edge 120. Therefore, it is ensured that the first gap is gradually reduced from top to bottom, which can effectively improve the efficiency of the fan.

In any one of the above-mentioned embodiments, the number of the second blade 12 is multiple, and the multiple second blades 12 are evenly arranged on the cover plate 10 along a circumferential direction of the cover plate 10.

In this embodiment, the number of the second blade 12 is multiple, and the multiple second blades 12 are evenly arranged on the cover plate 10 along a circumferential direction of the cover plate 10.

Figure 6:
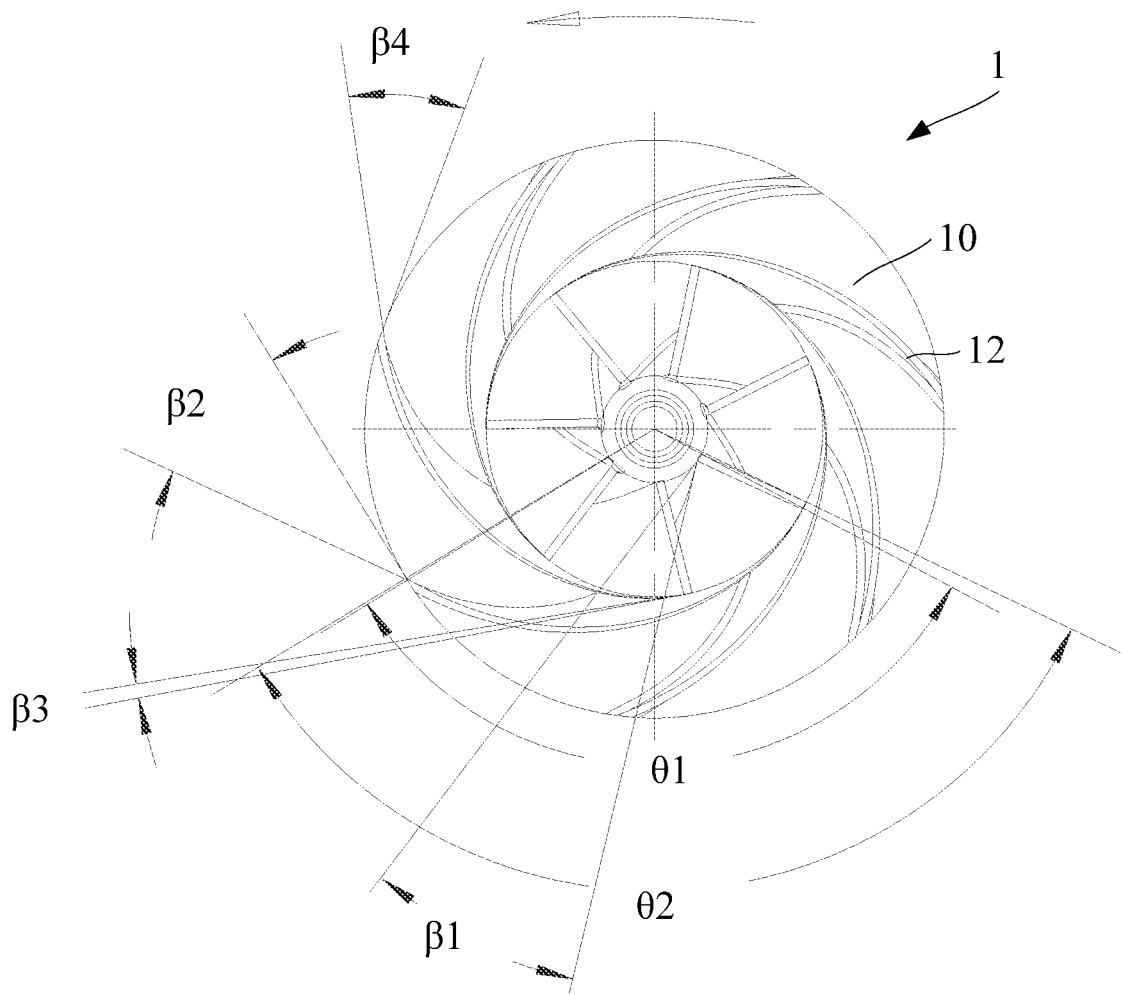
FIG. 6 shows further another structural schematic diagram of an impeller of an embodiment of the present disclosure.

For example, as shown in FIG. 6, the projection of the root of the second blade 12 on the plane perpendicular to the axial direction satisfies: the wrap angle $\theta 1$ is within the range of $120°±3°$. The projection of the top of the second blade 12 on the plane perpendicular to the axial direction satisfies: the wrap angle $\theta 2$ is within the range of $123°±3°$. For example, the root of the second blade 12 is the junction of the second blade 12 and the cover plate 10, and the top of the second blade 12 is the end of the second blade 12 away from the cover plate 10. The wrap angle $\theta 1$ is the angle between a line connecting the two end points of the projection of the root of the second blade 12 on the plane perpendicular to the axial direction and the axis. The wrap angle $\theta 2$ is the angle between a line connecting the two end points of the projection of the top of the second blade 12 on a plane perpendicular to the axial direction and the axis.

$$\theta 2 \geq \theta 1$$

For example, the larger the wrap angle of the second blade 12, the smaller the outflow and vortex in the flow channel, and the flow is closer to the profile of the second blade 12. Similarly, under the diameter of the impeller 1, the impeller 1 speed will be higher; however, the wrap angle of the second blade 12 that is too large will cause the friction loss to increase, the high-efficiency point will move in the direction of small flow, and it will also cause difficulty in demolding. The wrap angle range given in the present disclosure can make the impeller 1 work efficiently within the speed range of 100,000 rpm to 150,000 rpm.

As shown in FIG. 6, the projection of the root of the second blade 12 on the plane perpendicular to the axial direction satisfies: the inlet placement angle $\beta 1$ is within the range of $23.5°±3°$; the outlet placement angle $\beta 2$ is within the range of $33.5±3°$. The projection of the top of the second blade 12 on the plane perpendicular to the axial direction satisfies: the inlet placement angle $\beta 3$ is within the range of $0°\sim3°$; the outlet placement angle $\beta 4$ is within the range of $28.5±3°$.

For example, the selection of the inlet placement angle will affect the flow state when the fluid enters the impeller 1 channel. A proper inlet placement angle can reduce the squeezing effect of the root inlet of the second blade 12 and increase the flow area. At the same time, it can avoid serious flow loss at the inlet end of the suction surface, and can reduce the flow loss. The selection of the outlet placement angle will affect the vacuum of the fan. It is an effective measure to improve the efficiency of the centrifugal fan to reduce the outlet placement angle while reducing the outer diameter of the impeller 1. Because the working speed of the impeller 1 of this embodiment can reach 150,000 rpm, an excessively large impeller 1 diameter will cause insufficient structural strength and the impact of unbalanced mass on the rotor assembly, but if the outlet placement angle is too small, it will affect the manufacturability of the product. Choosing the above-mentioned inlet and outlet placement angles can make the impeller 1 enter and exit fluid in the speed range of 100000 rpm~150,000 rpm to maintain uniformity, reduce fluid loss, improve the vacuum and efficiency of the fan, and reduce the outer diameter of the impeller 1 to ensure strength and manufacturability.

The maximum diameter of impeller 1 does not exceed 32 mm.

As shown in FIG. 8, the outer wall surface of the cover plate 10 is formed as a smooth concave surface, the upper inflow angle $\delta 1$ of the outer wall surface of the cover plate 10 is in the range of $4°±2°$, and the lower end outflow angle $\delta 2$ is in the range of $57.5°±2°$.

The thickness of the second blade 12 gradually increases from the front edge 120 to the rear edge 122, and the ratio of the thickness of the front edge 120 to the thickness of the rear edge 122 is not less than 80%.

The impeller 1 has 7 second blades 12 equally spaced along the circumferential direction.

In any one of the above-mentioned embodiments, an inner wall surface of the wind hood 3 includes a first inner wall surface 34 corresponding to the cover plate 10 and a second inner wall surface 36 corresponding to the first protrusion 20, the first inner wall surface 34 protrudes from an outside of the wind hood 3 to an axial direction of the wind hood 3, the second inner wall surface 36 is recessed from an axis of the wind hood 3 toward an outside direction of the wind hood 3. The first inner wall surface 34, the second inner wall surface 36, an outer wall surface of the cover plate 10, an outer wall surface of the first protrusion 20, an outer wall surface of the inner ring arm 22, and an inner wall surface of the outer ring arm 24 constitute the wind tunnel.

As shown in FIG. 1, in this embodiment, the inner wall surface of the wind hood 3 includes a first inner wall surface 34 and a second inner wall surface 36, the first inner wall surface 34 is arranged corresponding to the cover plate 10, and the second inner wall surface 36 is arranged corresponding to the first protrusion 20. And the first inner wall surface 34 is a smooth convex surface, and the second inner wall surface 36 is a smooth concave surface. It forms a variable section portion and an equal section portion with the cover plate 10, the first protrusion 20, the inner ring arm 22 and the outer ring arm 24. For example, the first inner wall surface 34, the second inner wall surface 36, the outer wall surface of the cover plate 10, the outer wall surface of the first protrusion 20, the outer wall surface of the inner ring arm 22, and the inner wall surface of the outer ring arm 24 constitute a wind tunnel.

In any one of the above-mentioned embodiments, along the air inlet direction, a diameter of the first inner wall surface 34 and a diameter of the second inner wall surface 36 gradually increase.

In this embodiment, along the air inlet direction, a diameter of the inner wall surface of the wind hood 3 gradually increases.

In any one of the above-mentioned embodiments, a diameter of a joint between the second inner wall surface 36 and the outer ring arm 24 is the same as a diameter of an inner wall surface of the outer ring arm 24, along an axial direction of the driving structure 4, a height difference between a joint between the second inner wall surface 36 and the outer ring arm 24, and a joint between the first protrusion 20 and the inner ring arm 22 is less than or equal to a third threshold.

As shown in FIG. 1, in this embodiment, the diameter of the joint between the second inner wall surface 36 and the outer ring arm 24 is the same as the diameter of the inner wall surface of the outer ring arm 24. Thus, the inner wall surface of the wind hood 3 and the outer ring arm 24 are smoothly and transitionally connected to reduce the impact loss of the airflow and improve the efficiency of the fan.

Along the axial direction of the driving structure 4, the height difference between the joint between the second inner wall surface 36 and the outer ring arm 24, and the joint between the first protrusion 20 and the inner ring arm 22 is less than or equal to the third threshold, and the third threshold is optionally 0 mm to 5 mm. In other words, the joint between the second inner wall surface 36 and the outer ring arm 24 is roughly at the same height as the joint between the first protrusion 20 and the inner ring arm 22.

In any one of the above-mentioned embodiments, the wind hood 3 further comprises a collecting surface 38. Along an air inlet direction, a diameter of the collecting surface 38 being gradually decreased. The air inlet 30 is located at one end of the collecting surface 38, another end of the collecting surface 38 and the first inner wall surface 34 are smoothly and transitionally connected. One end of the impeller 1 facing the air inlet 30 is located in the wind hood 3.

As shown in FIG. 1, in this embodiment, along an air inlet direction, a diameter of the collecting surface 38 being gradually decreased, the air inlet 30 being located at one end of the collecting surface 38, another end of the collecting surface 38 and the first inner wall surface 34 smoothly and transitionally connected. Thus, the airflow establishes a uniform velocity field and fluid field before entering the flow channel of the impeller 1, which can effectively improve the efficiency of the fan. Further, one end of the impeller 1 toward the air inlet 30 is located in the wind hood 3. For example, the collecting surface 38, the first inner wall surface 34 and the second inner wall surface 36 together constitute the inner wall surface of the wind hood 3, and the wind hood 3 is a thin-walled structure.

In any one of the above-mentioned embodiments, the driving structure 4 further comprises a bearing assembly 6 and a rotor 8. The bearing assembly 6 includes a rotation shaft 68, a bushing 60 being nested on the rotation shaft 68, and multiple sets of rolling bodies 62 arranged between the bushing 60 and the rotation shaft 68. The impeller 1 is fixed on one end of the rotation shaft 68. The rotor 8 is fixed on another end of the rotation shaft 68.

Figure 9:
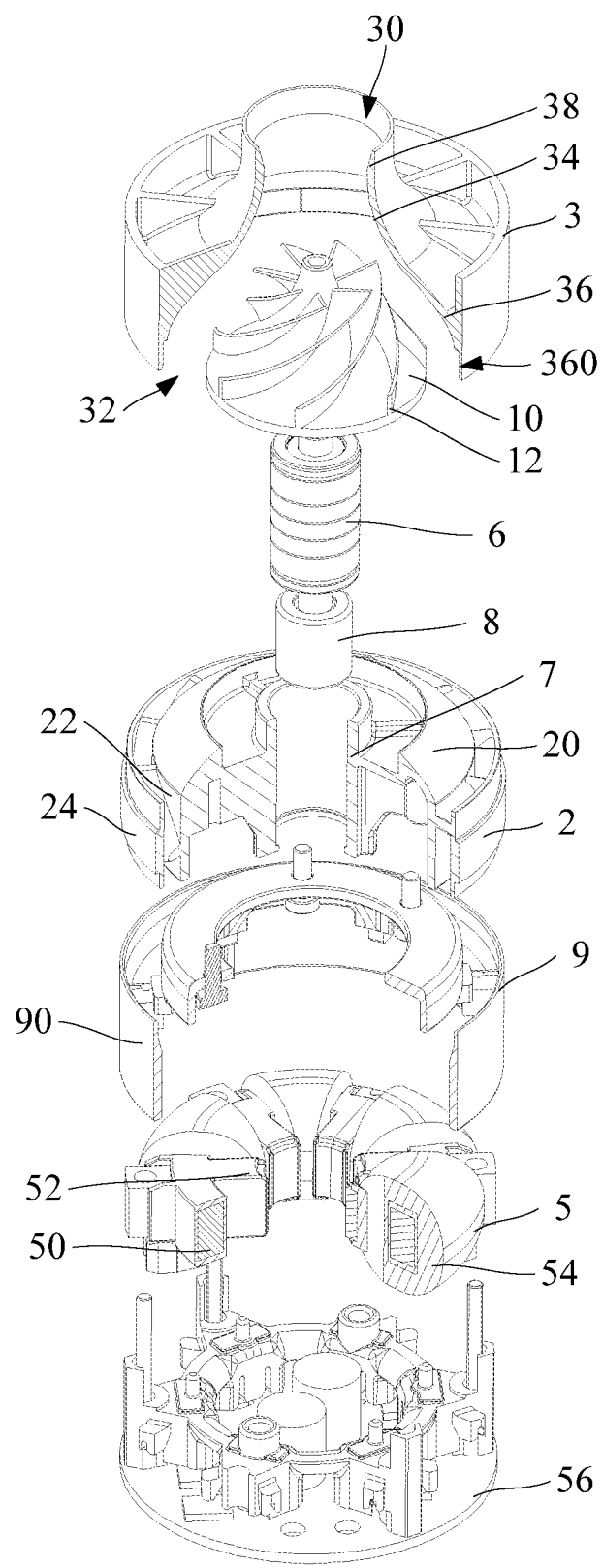
FIG. 9 shows an exploded structural schematic diagram of a fan of an embodiment of the present disclosure.
Figure 10:
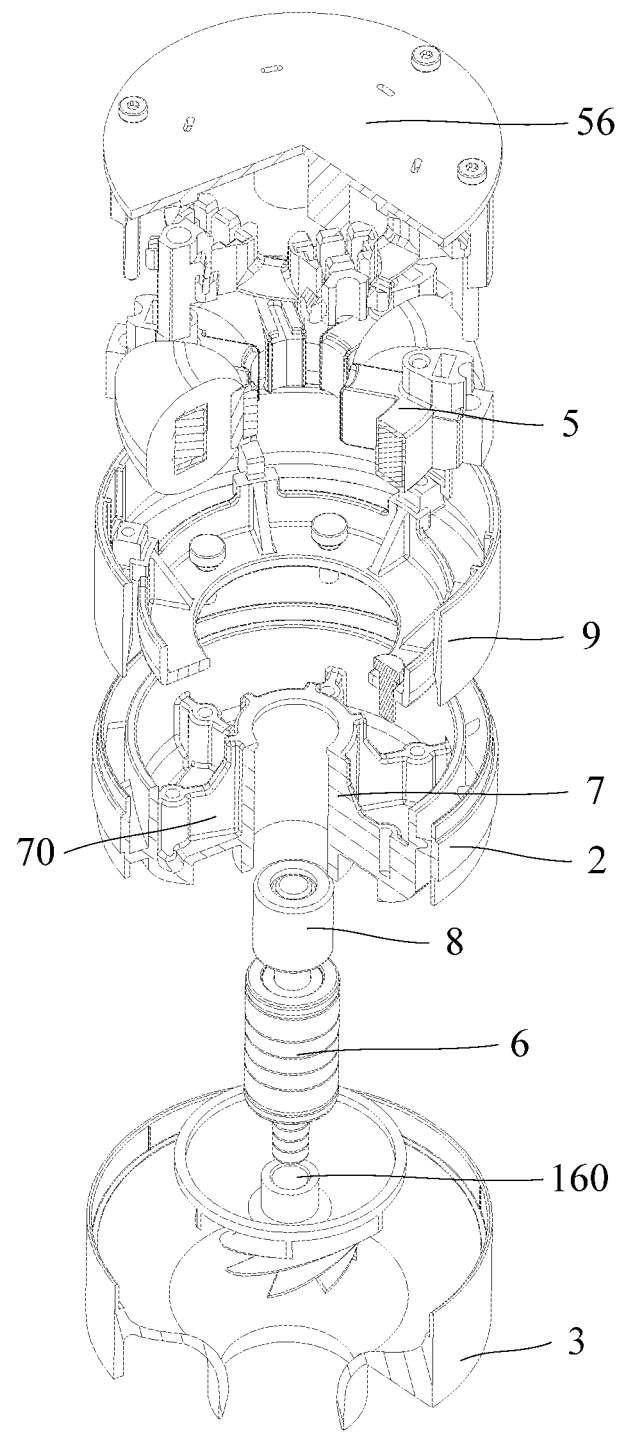
FIG. 10 shows another exploded structural schematic diagram of a fan of an embodiment of the present disclosure.

As shown in FIGS. 9 and 10, in this embodiment, the driving structure 4 further comprises the bearing assembly 6 and the rotor 8. The bearing assembly 6 is housed in the first installation cavity 28 and partially extends into the second installation cavity 100, and the bearing assembly 6 includes bushing 60 and multiple sets of rolling body 62. The rolling body 62 is located between the bushing 60 and the rotation shaft 68. The rotation shaft 68 passes through the bushing 60 and the rolling body 62, one end is connected to the impeller 1, the another end is connected to the rotor 8, and the rotor 8 is fixed at the lower end of the rotation shaft 68. Further, the rolling body 62 is evenly arranged between the bushing 60 and the rotation shaft 68 along the circumference of the rotation shaft 68.

In any one of the above-mentioned embodiments, an outer diameter of the bushing 60 is greater than or equal to 12 mm and less than or equal to 14 mm, an outer diameter of an area on the rotation shaft 68 that cooperates with the bushing 60 is greater than or equal to 4 mm and less than or equal to 6 mm.

In this embodiment, the outer diameter of the bushing 60 is greater than or equal to 12 mm and less than or equal to 14 mm, correspondingly, the outer diameter of an area on the rotation shaft 68 that cooperates with the bushing 60 is greater than or equal to 12 mm and less than or equal to 14 mm. the bushing 60 has an outer cylindrical surface with a diameter of 13 mm, and the part of the rotation shaft 68 corresponding to the axis of the bushing 60 has an outer cylindrical surface with a diameter of 5 mm.

In any one of the above-mentioned embodiments, the cover plate 10 and the first protrusion 20 are thin-walled structures, the first protrusion 20 defines a first installation cavity 28, and the cover plate 10 defines a second installation cavity 100, an installation portion 16 is provided in the second installation cavity 100, the installation portion 16 is sleeved outside the rotation shaft 68, and the impeller 1 is fixed on the rotation shaft 68 through the installation portion 16. The rolling body 62 adjacent to the impeller 1 is at least partially located in the second installation cavity 100.

Figure 7:
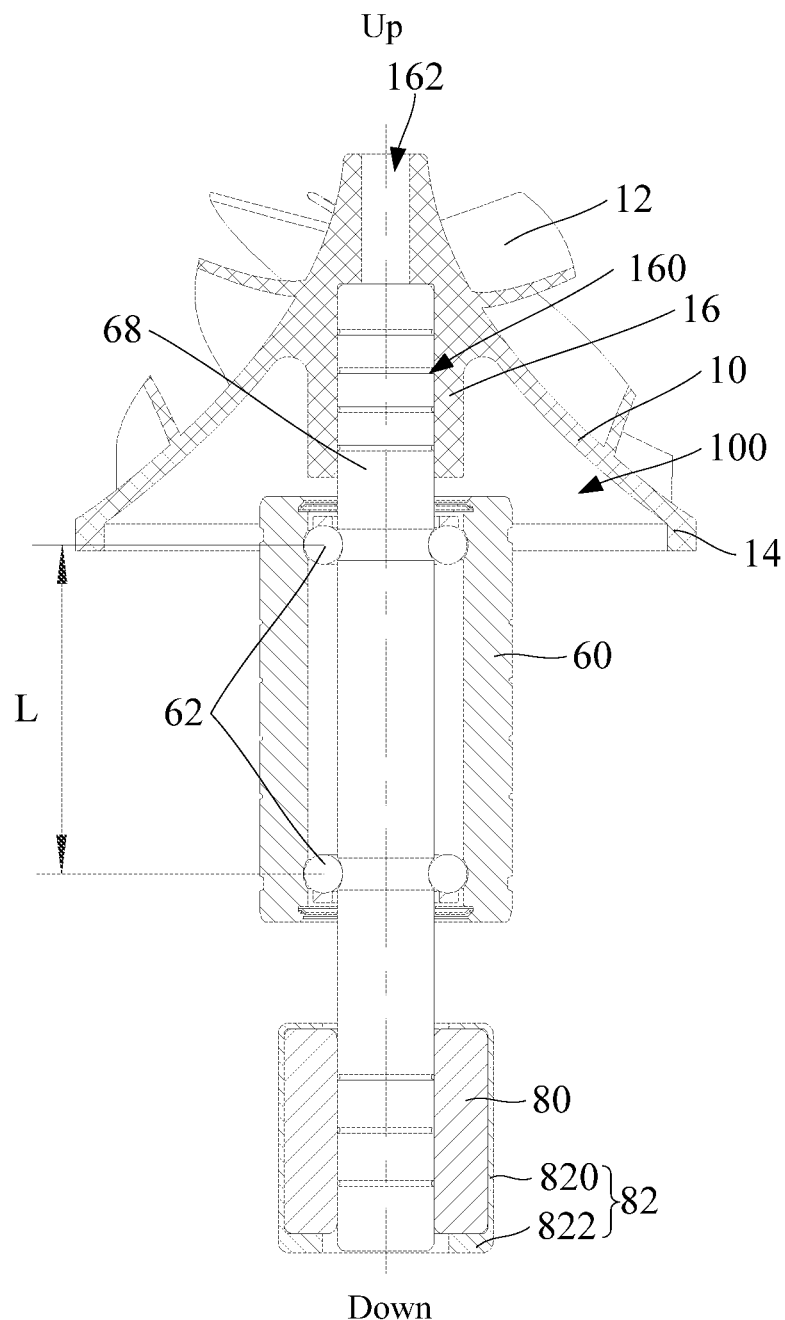
FIG. 7 shows a cross-sectional view of a partial structure of a fan of an embodiment of the present disclosure.

As shown in FIGS. 7 and 8, the cover plate 10 and the first protrusion 20 are thin-walled structures, so the inside of the first protrusion 20 defines the first installation cavity 28, and the inside of the cover plate 10 defines the second installation cavity 100. The thin-walled structure can ensure the shrinkage consistency of the impeller 1 during molding, while reducing the moment of inertia of the impeller 1, improving efficiency, and at the same time, under the premise that the axial size permitting, making the support position as adjacent to the center of gravity of the impeller 1 as possible, which can reduce the impact of impeller 1 imbalance on the bearing, thereby improving the reliability of the assembly. Further, the installation portion 16 is arranged in the second installation cavity 100 and does not exceed the second installation cavity 100, the cover plate 10 is installed on the driving structure 4 through the installation portion 16, and the rolling body 62 adjacent to the impeller 1 is at least partially located in the second installation cavity 100, which is conducive to improving the efficiency of fan.

In any one of the above-mentioned embodiments, a through hole 162 is arranged on the installation portion 16, and the through hole 162 is arranged along the axial direction of the installation portion 16.

As shown in FIG. 7, in this embodiment, the installation portion 16 is further provided with a through hole 162, the diameter of the through hole 162 is smaller than the diameter of the installation portion 16 and the installation hole 160 of the driving structure 4, and penetrates the installation portion 16 along the axial direction. The setting of the through hole 162, on the one hand, plays a role of venting when installing the driving structure 4, preventing the closed hole from causing assembly errors; at the same time, it can reduce the material and the moment of inertia. For example, the rotation shaft 68 is fixedly connected to the installation hole 160, and the combined length of the rotation shaft 68 and the installation hole 160 is greater than or equal to 6 mm and less than or equal to 10 mm. Under the premise of ensuring the reliability of positioning, make full use of the axial space.

In any one of the above-mentioned embodiments, the number of the rolling bodies 62 is two.

As shown in FIGS. 7 and 8, in this embodiment, the number of the rolling body 62 is two. The two rolling bodies 62 are located at both ends of bushing 60, and the rolling body 62 adjacent to impeller 1 is at least partially located in the second installation cavity 100.

Further, as shown in FIG. 7, the axial span L between the two sets of the rolling bodies is between 16 mm~18 mm.

Further, the axial span L between the two sets of the rolling bodies is between 10 mm~12 mm.

Further, the outer circumference of the rotation shaft 68 is provided with two grooves at an axial interval, the span of the two grooves is consistent with the span L of the rolling body 62, and the two sets of rolling bodies 62 are respectively arranged in the grooves. The raceway of the rolling body 62 is directly opened on the rotation shaft, which can save the radial size occupied by the inner ring of the bearing assembly 6. Under the premise that the shaft diameter is not reduced, the center distance of the rolling body 62 is further reduced, which can effectively increase the limit speed of the bearing.

The center distance of the rolling body 62 is 6.4 mm.

The inner circumference of the bushing 60 is provided with two grooves at an axial interval, the span of the groove is consistent with the span L of the rolling body 62, and the two sets of rolling bodies 62 are respectively arranged in the grooves. The raceway of the rolling body 62 is directly opened on the bushing 60, which can save the radial size occupied by the outer ring of the bearing assembly 6. Thus, the bushing 60 has a greater thickness and improves overall rigidity; or further reduces the outer diameter of bushing 60 and reduces the weight of components.

As shown in FIG. 2, a first outer ring and a second outer ring 66 are fixedly arranged inside both ends of the bushing 60, respectively. The inner peripheral surfaces of the first outer ring 64 and the second outer ring 66 are respectively provided with grooves, and the two sets of rolling bodies 62 are respectively arranged in the grooves. The outer ring and the bushing 60 of this structure are assembled parts, and the axial distance of the two outer rings can be adjusted to control the clearance, apply pre-tightening force, and reduce the processing accuracy requirements of the bushing 60.

The rotation shaft 68 is a through shaft with a diameter of 5 mm. There are several grooves on the through shaft to install the rolling body 62 and contain the adhesive. The machining difficulty of the through shaft is lower than that of the stepped shaft, and the machining accuracy is higher than that of the stepped shaft, and it can avoid the undercut caused by the stepped shaft and other local features that are prone to stress concentration, and improve the stiffness and strength of the shaft.

Further, the rolling body 62 and the shaft are made of metal. The bearing assembly 6 made of metal can run stably at a working speed of 150,000 rpm, which is economical.

Further, the rotation shaft 68 is made of metal, and the rolling body 62 is made of ceramic. The metal through shaft with a diameter of 5 mm has a certain rigidity, which can be applied to the design requirements of most small high-speed fans. The bearing assembly 6 with ceramic ball can run stably at the working speed of 160000 rpm~170000 rpm, which can increase the limit speed, and at the same time has a certain economic efficiency.

The two sets of the rolling bodies have the same number of rolling sub-body; the number of rolling sub-body is 6 or 7.

In any one of the above-mentioned embodiments, the diffuser 2 further comprises: a bearing seat 7, being sleeved on the bushing 60 and accommodated in the first installation cavity 28, the bearing seat 7 being connected with the first protrusion 20, and at least part of the bearing seat 7 extending into the second installation cavity 100.

In this embodiment, the diffuser 2 further comprises the bearing seat 7, sleeved on the bushing 60, and housed in the first installation cavity 28, the bearing seat 7 is connected with the first protrusion 20, and at least part of bearing seat 7 extends into the second installation cavity 100 to increase the air efficiency of the fan.

In any one of the above-mentioned embodiments, a bead 70 is provided between the bearing seat 7 and the inner ring arm 22.

In this embodiment, a number of bead 70 are evenly arranged along the circumferential direction between the bearing seat 7 and the inner ring arm 22 to improve the reliability of the connection.

In any one of the above-mentioned embodiments, the first protrusion 20, the inner ring arm 22, the outer ring arm 24 and the bearing seat 7 are an integrated structure.

In this embodiment, the coaxiality between the impeller 1 and the wind hood 3 must be guaranteed by the dimensional chain between the bearing assembly 6, the bearing seat 7, the first notch 240 of the diffuser 2 and the second notch 360 of the wind hood 3. The coaxiality will directly affect the uniformity of the tip gap between the impeller 1 and the wind hood 3, thereby affecting the efficiency. The bearing seat 7, the inner ring arm 22, the outer ring arm 24 and other features are integrated as a diffuser 2, so that the above-mentioned dimensional chain can be concentrated on as few matching parts as possible, thereby ensuring assembly and high efficiency.

In any one of the above-mentioned embodiments, the rotor 8 comprises a magnetic ring 80, being sleeved outside the rotation shaft 68; and a protective sheath 82, being sleeved outside the magnetic ring 80. There is a gap between the magnetic ring 80 and the bushing 60 along an axial direction of the rotation shaft 68.

As shown in FIG. 7, in this embodiment, the rotor 8 includes the magnetic ring 80 formed into a ring, and a protective sheath 82 fixedly sleeved on the outer peripheral surface of the magnetic ring 80. The magnetic ring 80 and the shaft are fixedly connected under the bearing assembly 6, and there is a gap between the magnetic ring 80 and the bushing 60 to prevent the rolling body 62 from being magnetized and affecting its service life.

In any one of the above-mentioned embodiments, the gap is greater than or equal to 3 mm.

In this embodiment, keep an axial distance of at least 3 mm between the end surface of the magnetic ring 80 and the end surface of the bushing 60 to prevent the rolling body 62 from being magnetized, thereby affecting the life of the bearing assembly 6.

Further, as shown in FIG. 7, the protective sheath 82 has an integrally formed strengthening portion 820 and balanced portion 822. For example, the strengthening portion 820 is mainly arranged on the outer circumferential surface of the magnetic ring 80, has a thickness of 0.2 mm~0.3 mm, and is fixed on the end surface of the magnetic ring 80 through a spinning process to protect the magnetic ring 80 from disintegration during high-speed operation. The balanced portion 822 is arranged on another end of the magnetic ring 80 away from the spinning part, and has a thickness of about 1 mm, which plays a role of balance and weight removal. The integrated design of the protective sheath 82 structure can reduce the number of parts, simplify the assembly process, and reduce costs.

The balanced portion 822 is arranged on one side away from the bushing 60. In other words, the balanced portion 822 is arranged at the end of the rotor 8. The balanced portion 822 away from the center of gravity of the rotor 8 is convenient for deduplication and can improve the efficiency and reliability of deduplication.

The balanced portion 822 is arranged on one side adjacent to the bushing 60. In other words, the balanced portion 822 is arranged between the bearing and the magnetic ring 80. The balanced portion 822 adjacent to the center of gravity of the rotor 8 can shorten the axial length and make full use of the axial space.

The protective sheath 82 is a non-magnetic material.

In any one of the above-mentioned embodiments, the fan further comprises a frame 9, being connected to the diffuser 2, and arranged adjacent to the air outlet 32, the stator assembly 5 being connected to the bearing seat 7 through the frame 9, and a first flow path being formed between the stator assembly 5 and the frame 9, and a second flow path being formed between the stator assembly 5 and the rotor 8, the first flow path and the second flow path being communicated with the wind tunnel.

As shown in FIG. 10, in this embodiment, the stator assembly 5 is arranged on the radial outer side of the rotor 8 and is fixedly connected to the bearing seat 7 through the frame 9. The stator assembly 5 is fixedly arranged on the axial lower side of the diffuser 2, and at least part of the stator assembly 5 is located in the wind tunnel to improve the heat dissipation effect of the stator assembly 5. At the same time, there is a first flow path between the stator assembly 5 and the frame 9, and a second flow path between the stator assembly 5 and the rotor 8. The first flow path and the second flow path are communicated to the wind tunnel to cool the heating components on the flow path.

For example, as shown in FIG. 9, the stator assembly 5 includes a ring-shaped stator yoke 50 and a number of stator teeth 52 that are arranged at intervals in the circumferential direction inside the stator yoke 50 and extend radially inward. The stator teeth 52 are formed as an inner surface on the radial inner side, which is in clearance fit with the outer diameter of the rotor 8, and is arranged corresponding to the rotor 8 in the axial direction. The stator assembly 5 further comprises a winding 54 wound on the yoke. The maximum diameter of the winding 54 is smaller than the maximum diameter of the wind tunnel, and the minimum diameter is larger than the inner surface of the stator teeth 52.

Further, the frame 9 has a ring-shaped shell 90 arranged axially below the outer ring arm 24, and the shell 90 is provided with a stator installation portion 16, and the stator assembly 5 is fixed and housed inward. A first flow path is formed between the inner wall of the shell 90 and the winding 54, which is used to draw the fluid in the wind tunnel out of the fan, while cooling the stator devices on the flow path. At the same time, the space between the stator and the rotor 8 forms a second flow path. The second flow path is communicated and connected to the wind tunnel through the upper space of the stator assembly 5, and the fluid in the wind tunnel is introduced between the stator assembly 5 and the rotor 8 to cool the heating parts on the flow path.

In any one of the above-mentioned embodiments, the fan further comprises a control board 56, being arranged at one end of the stator assembly 5 away from the diffuser 2, and at least part of the control board 56 is located in the first flow path and the second flow path.

As shown in FIG. 10, in this embodiment, the air flow in the wind tunnel cools the components on the stator assembly 5 and the rotor 8 and the electric control board through the first flow path and the second flow path. At the same time, the first flow path and the second flow path are located below the wind tunnel. In other words, the high-speed gas is introduced to other heating components for cooling after the completion of the expansion, so it will not affect the state of the airflow in the wind tunnel, thus achieving a good heat dissipation design of the whole machine while ensuring the efficiency.

For example, according to the fan of an embodiment of the present disclosure, without changing the structure of the whole machine, according to different design requirements, by adjusting the input electrical parameters, the fan can be efficiently operated at 100,000 rpm to 150,000 rpm within the speed range.

By testing the fan of the above-mentioned embodiment, the test results shown in Table 1 are obtained. From the table, it can be seen that for the design requirements of different power sections, the fan of this embodiment can adjust the speed through self-balancing, and it runs efficiently in the speed range of 100,000 rpm~150,000 rpm. When the suction power is 550 W, it can run stably at 150,000 rpm, and obtain the efficiency of the whole machine higher than 52.5%, while covering down to 200 W, the efficiency is higher than 54.5%.

TABLE 1

| input power | W | 539.5 | 496.9 | 445.1 | 398.9 | 346.4 | 300.6 | 248.5 | 204 |
|---|---|---|---|---|---|---|---|---|---|
| rotation speed | rpm | 150376 | 145985 | 139373 | 134680 | 126582 | 120120 | 112045 | 103627 |
| flow rate | dm^3/s | 13.96 | 13.65 | 13.22 | 12.82 | 12.3 | 11.77 | 11.08 | 10.42 |
| vacuum | kPa | 20.39 | 19.32 | 18 | 16.79 | 15.34 | 13.94 | 12.22 | 10.72 |
| suction power | W | 284.08 | 263.58 | 238.02 | 215.29 | 188.43 | 163.98 | 135.43 | 111.69 |
| efficiency | % | 52.66 | 53.04 | 53.47 | 53.96 | 54.39 | 54.55 | 54.49 | 54.76 |
| input power | W | 539.5 | 496.9 | 445.1 | 398.9 | 346.4 | 300.6 | 248.5 | 204 |
| rotation speed | rpm | 150376 | 145985 | 139373 | 134680 | 126582 | 120120 | 112045 | 103627 |
| flow rate | dm^3/s | 13.96 | 13.65 | 13.22 | 12.82 | 12.3 | 11.77 | 11.08 | 10.42 |
| vacuum | kPa | 20.39 | 19.32 | 18 | 16.79 | 15.34 | 13.94 | 12.22 | 10.72 |
| suction power | W | 284.08 | 263.58 | 238.02 | 215.29 | 188.43 | 163.98 | 135.43 | 111.69 |
| efficiency | % | 52.66 | 53.04 | 53.47 | 53.96 | 54.39 | 54.55 | 54.49 | 54.76 |

According to the second aspect of the present disclosure, an electric appliance (not shown in the figures) is also provided, including: the fan provided in any one of the embodiments of the first aspect.

The electric appliance provided in the second aspect of the present disclosure includes the fan provided in any one of the above-mentioned embodiments, so it has all the beneficial effects of the fan.

For example, the electric appliance may be a vacuum cleaner or an air conditioner.

In the present disclosure, the term "plurality" means two or more, unless otherwise expressly defined. The terms "installing", "connected", "connection", "fixing" and the like should be understood in a broad sense. For example, "connection" may be a fixed connection, a removable connection or an integral connection; and "connected" may refer to direct connection or indirect connection through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the specific features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A fan comprising:
   a driving structure;
   an impeller, comprising a cover plate installed on the driving structure, the cover plate being recessed in an axial direction of the impeller, and a diameter of the cover plate gradually increasing along an air inlet direction;
   a wind hood, being covered on the impeller, and comprising an air inlet and an air outlet communicated to the air inlet; and
   a diffuser, being located at one end of the impeller facing the air outlet, and the diffuser comprising:
      a first protrusion connected to the driving structure, the first protrusion protruding in a direction of the wind hood, wherein a diameter of one end of the first protrusion adjacent to the cover plate is smaller than a diameter of another end of the first protrusion away from the cover plate, and
      an inner ring arm connected to the first protrusion and an outer ring arm sleeved outside the inner ring arm, wherein the outer ring arm is smoothly and transitionally connected to the wind hood, and wherein the first protrusion, the inner ring arm, and the outer ring arm are coaxial,
   wherein:
      the wind hood, the cover plate, and the diffuser defines a wind tunnel, and
      the wind tunnel comprises a variable section portion and an equal section portion, the variable section portion is arranged adjacent to the air inlet, and the equal section portion is arranged adjacent to the air outlet, and
   wherein the diffuser further comprises:
      a first blade, being arranged between the inner ring arm and the outer ring arm, and both ends of the first blade along a radial direction of the diffuser are respectively being attached to the inner ring arm and the outer ring arm, so that the first blade, the inner ring arm and the outer ring arm define an air guiding cavity,
      wherein the first blade is in a spiral shape, the first blade comprises an inlet end and an outlet end along the air inlet direction, and the inlet end is located behind the outlet end along a rotation direction of the impeller.

2. The fan according to claim 1, wherein the driving structure comprises a stator assembly, being arranged relative to the air outlet so that the wind flow from the air outlet blowing directly to the stator assembly.

3. The fan according to claim 2, wherein an angle between an extension direction of one end of the cover plate facing the first protrusion and an extension direction of another end of the first protrusion facing the cover plate is less than or equal to a first threshold.

4. The fan according to claim 2, wherein:
   one end of the first protrusion facing the air inlet is provided with a ring-shaped depression,
   another end of the cover plate facing the diffuser is provided with a ring-shaped protrusion portion, and
   the depression is in clearance fit with the ring-shaped protrusion portion.

5. The fan according to claim 2, wherein a diameter of a joint between the first protrusion and the inner ring arm is the same as a diameter of an outer wall surface of the inner ring arm and is smoothly and transitionally connected.

6. The fan according to claim 2, wherein:
   one side of the outer ring arm away from an axis of the driving structure is provided with a first notch, and one side of the wind hood facing an axis of the driving structure is provided with a second notch adapted to the first notch, and
   the first notch and the second notch are both ring-shaped, and one side of the outer ring arm facing the air inlet abuts against a bottom of the second notch.

7. The fan according to claim 1, wherein the first blade is completely located in an air cavity between the inner ring arm and the outer ring arm.

8. The fan according to claim 1, wherein:
   an angle between an extension direction of the inlet end and a radial direction of the inner ring arm is less than or equal to a second threshold, and
   the outlet end comprises a first inner end point connected to the inner ring arm and a first outer end point connected to the outer ring arm, and the first inner end point is located at the front of the first outer end point along a rotation direction of the impeller.

9. The fan according to claim 8, wherein:
   along an axial direction of the diffuser, the inlet end is a smooth curved surface convex in a direction of the impeller, and the outlet end is a smooth curved surface convex in a direction away from the impeller, and
   along a rotation direction of the impeller, in two sides of the first blade, a front side is convex toward the rotation direction of the impeller, and a rear side is recessed toward the rotation direction of the impeller.

10. The fan according to claim 1, wherein:
    the inner ring arm, the first blade and the outer ring arm are an integrated structure; and/or
    the number of the first blade is multiple, and the multiple first blades are evenly distributed between the inner ring arm and the outer ring arm along a circumference of the inner ring arm.

11. The fan according to claim 4,
    wherein the impeller further comprises a second blade arranged on the cover plate and located in the wind tunnel,
    wherein along the air inlet direction, the second blade comprises a front edge adjacent to the air inlet and a rear edge adjacent to the air outlet and along the rotation direction of the impeller, the front edge is located in front of the rear edge.

12. The fan according to claim 11, wherein:
an angle between an extension direction of the front edge and an axial direction of the driving structure is within a range of 76°±2°, and
the rear edge is located on a cylindrical surface formed by an outer side wall of the ring-shaped protrusion portion.

13. The fan according to claim 12, wherein:
the front edge comprises a second inner end point connected to the cover plate and a second outer end point away from the cover plate; along a rotation direction of the impeller, the second outer end point is located at the front of the second inner end point; and in a direction from the air outlet to the air inlet, the second inner end point is located below the second outer end point, and the second outer end point is located at an end of the cover plate facing the air inlet and below the air inlet, and
the rear edge comprises a third inner end point connected to the cover plate and a third outer end point away from the cover plate; the third inner end point is located on a circumferential line of the impeller facing one end of the diffuser; and in a direction from the air outlet to the air inlet, the third outer end point is located above the third inner end point.

14. The fan according to claim 13, wherein:
in a projection of the impeller on a plane perpendicular to an axis of the driving structure, an angle between a line between the second inner end point and an axis of the driving structure and a line between the second outer end point and an axis of the driving structure is greater than or equal to 0° and less than or equal to 5°; and/or
in a projection of the impeller on a plane perpendicular to an axis of the driving structure, an angle between a line between the third inner end point and an axis of the driving structure and a line between the third outer end point and an axis of the driving structure is greater than or equal to −2° and less than or equal to 2°; and/or
the front edge protrudes toward a direction of the air inlet, and a length of the rear edge is less than a length of the front edge.

15. The fan according to claim 11,
wherein a first gap is provided between one end of the second blade away from an axis of the impeller and the inner wall surface of the wind hood,
wherein the first gap is arranged equidistantly in a direction from the air inlet to the air outlet, or the first gap is gradually reduced in a direction from the air inlet to the air outlet.

16. The fan according to claim 15, wherein:
the first gap is greater than or equal to 0.2 mm and less than or equal to 0.3 mm; and/or
the number of the second blade is multiple, and the multiple second blades are evenly arranged on the cover plate along a circumferential direction of the cover plate.

17. The fan according to claim 1, wherein:
an inner wall surface of the wind hood comprises a first inner wall surface corresponding to the cover plate and a second inner wall surface corresponding to the first protrusion, the first inner wall surface protrudes from an outside of the wind hood to an axial direction of the wind hood, the second inner wall surface is recessed from an axis of the wind hood toward an outside direction of the wind hood, and along the air inlet direction, a diameter of the first inner wall surface and a diameter of the second inner wall surface gradually increase, and
the first inner wall surface, the second inner wall surface, an outer wall surface of the cover plate, an outer wall surface of the first protrusion, an outer wall surface of the inner ring arm, and an inner wall surface of the outer ring arm define the wind tunnel.

18. The fan according to claim 17, wherein:
a diameter of a joint between the second inner wall surface and the outer ring arm is the same as a diameter of an inner wall surface of the outer ring arm,
along an axial direction of the driving structure, a height difference between a joint between the second inner wall surface and the outer ring arm, and a joint between the first protrusion and the inner ring arm is less than or equal to a third threshold.

19. The fan according to claim 17,
wherein the wind hood further comprises a collecting surface,
wherein a diameter of the collecting surface gradually decreases along an air inlet direction, the air inlet is located at one end of the collecting surface, and another end of the collecting surface and the first inner wall surface are smoothly and transitionally connected, and
wherein one end of the impeller facing the air inlet is located in the wind hood.

20. The fan according to claim 2, wherein the driving structure further comprises:
a bearing assembly, comprising a rotation shaft, a bushing being nested on the rotation shaft, and multiple sets of rolling bodies arranged between the bushing and the rotation shaft, wherein the impeller is fixed on one end of the rotation shaft; and
a rotor, being fixed on another end of the rotation shaft.

21. The fan according to claim 20, wherein:
an outer diameter of the bushing is greater than or equal to 12 mm and less than or equal to 14 mm, and
an outer diameter of an area on the rotation shaft that cooperates with the bushing is greater than or equal to 4 mm and less than or equal to 6 mm.

22. The fan according to claim 20, wherein:
the cover plate and the first protrusion are thin-walled structures, the first protrusion defines a first installation cavity, the cover plate defines a second installation cavity, an installation portion is provided in the second installation cavity, the installation portion is sleeved on the rotation shaft, and the impeller is fixed on the rotation shaft through the installation portion, and
the rolling body adjacent to the impeller is at least partially located in the second installation cavity.

23. The fan according to claim 22, wherein the diffuser further comprises a bearing seat,
wherein the bearing seat is sleeved on the bushing and accommodated in the first installation cavity, the bearing seat is connected with the first protrusion, and at least part of the bearing seat extends into the second installation cavity.

24. The fan according to claim 23, wherein the first protrusion, the inner ring arm, the outer ring arm and the bearing seat are an integrated structure.

25. The fan according to claim 20, wherein the rotor comprises:
a magnetic ring, being sleeved outside the rotation shaft; and
a protective sheath, being sleeved outside the magnetic ring, wherein a gap is provided between the magnetic ring and the bushing along an axial direction of the rotation shaft.

26. The fan according to claim 23, further comprising a frame, being connected to the diffuser and arranged adjacent to the air outlet,
wherein the stator assembly is connected to the bearing seat through the frame, a first flow path is formed between the stator assembly and the frame, a second flow path is formed between the stator assembly and the rotor, and the first flow path and the second flow path are communicated with the wind tunnel.

27. The fan according to claim 26, further comprising a control board,
wherein the control board is arranged at one end of the stator assembly away from the diffuser, and at least part of the control board is located in the first flow path and the second flow path.

28. An electric appliance comprising the fan according to claim 1.

29. A fan comprising:
a driving structure;
an impeller, comprising a cover plate installed on the driving structure, the cover plate being recessed in an axial direction of the impeller, and a diameter of the cover plate gradually increasing along an air inlet direction;
a wind hood, being covered on the impeller, and comprising an air inlet and an air outlet communicated to the air inlet; and
a diffuser, being located at one end of the impeller facing the air outlet, and the diffuser comprising:
a first protrusion connected to the driving structure, the first protrusion protruding in a direction of the wind hood, wherein a diameter of one end of the first protrusion adjacent to the cover plate is smaller than a diameter of another end of the first protrusion away from the cover plate, and
an inner ring arm connected to the first protrusion and an outer ring arm sleeved outside the inner ring arm, wherein the outer ring arm is smoothly and transitionally connected to the wind hood, and wherein the first protrusion, the inner ring arm, and the outer ring arm are coaxial,
wherein:
the wind hood, the cover plate, and the diffuser defines a wind tunnel, and
the wind tunnel comprises a variable section portion and an equal section portion, the variable section portion is arranged adjacent to the air inlet, and the equal section portion is arranged adjacent to the air outlet, and
wherein:
an inner wall surface of the wind hood comprises a first inner wall surface corresponding to the cover plate and a second inner wall surface corresponding to the first protrusion, the first inner wall surface protrudes from an outside of the wind hood to an axial direction of the wind hood, the second inner wall surface is recessed from an axis of the wind hood toward an outside direction of the wind hood, and along the air inlet direction, a diameter of the first inner wall surface and a diameter of the second inner wall surface gradually increase, and
the first inner wall surface, the second inner wall surface, an outer wall surface of the cover plate, an outer wall surface of the first protrusion, an outer wall surface of the inner ring arm, and an inner wall surface of the outer ring arm define the wind tunnel.

* * * * *